United States Patent [19]

Coddington et al.

[11] Patent Number: 5,410,343

[45] Date of Patent: Apr. 25, 1995

[54] VIDEO-ON-DEMAND SERVICES USING PUBLIC SWITCHED TELEPHONE NETWORK

[75] Inventors: Carl D. Coddington, Accokeek, Md.; Bernard J. Craig, Nokesville, Va.; Larry A. Litteral, Manassas, Va.; Arthur A. Richard, III, Springfield, Va.; Jeffrey B. Gold, Silver Spring, Md.; Donald C. Klika, Jr., Falls Church; Daniel B. Konkle, Fairfax, both of Va.; James M. McHenry, Silver Spring, Md.

[73] Assignee: Bell Atlantic Network Services, Inc., Arlington, Va.

[21] Appl. No.: 42,270

[22] Filed: Apr. 2, 1993

Related U.S. Application Data

[63] Continuation-in-part of Ser. No. 766,535, Sep. 27, 1991, Pat. No. 5,247,347.

[51] Int. Cl.$^6$ .............................................. H04N 7/14
[52] U.S. Cl. .................................... 348/7; 348/12; 348/14; 379/105; 455/4.2
[58] Field of Search ......................... 348/6–8, 348/10–13; 455/4.2; 379/102, 104, 105, 93, 94

[56] References Cited

U.S. PATENT DOCUMENTS 3,766,324 10/1973 Budrys et al. .
4,332,980 6/1982 Reynolds et al. .
4,381,522 4/1983 Lambert .
4,506,387 3/1985 Walter .
4,654,866 3/1987 Bottle et al. .
4,755,872 7/1988 Bestler et al. .
4,761,684 8/1988 Clark et al. .
4,763,191 8/1988 Gordon et al. .
4,792,849 12/1988 McCalley et al. .
4,797,913 1/1989 Kaplan et al. .

(List continued on next page.)

FOREIGN PATENT DOCUMENTS 2193420 2/1988 United Kingdom .

OTHER PUBLICATIONS

"Visual Telephony as an ISDN Application", by Ming Liou, IEEE Communications Magazine (1990).
"1.544-Mbit/s Transmission of TV Signals by Interframe Coding System", by H. Yasuda et al., IEEE Transactions on Communications (1976).
"Enhanced Video Response System–VRS Phase II,–" by H. Nakajima, Japan Telecommunications Review (1979).
"Video Response System–VRS–," by K. Haji, International Conference on Communications (1978).
"Dial V for Video", Video Magazine dated Mar. 1982.
"MCPIC: A Video Coding Algorithm for Transmission and Storage Applications," by A. Wong et al., IEEE Communications Magazine (1990).
"Digital Multimedia Systems" Communications of the ACM, vol. 34, No. 4 (1991).
Talk given at the Motion Picture Industry Seminar, Dec. 3, 1984 "Dial-A-View" by A. F. Bulfer.
"A Trial of a National Pay-Per-View Ordering and (List continued on next page.)

Primary Examiner—Wing F. Chan
Attorney, Agent, or Firm—Lowe, Price, LeBlanc & Becker

[57] ABSTRACT

A public switched telephone network (PSTN) provides digital video signals from a video information provider or digital service bureau to one or more of a plurality of subscriber premises. Administration of orders from subscribers is carried out by a video gateway and file servers at the central office. Asymmetrical digital subscriber line interface (ADSL) units over a local loop carry the necessary signalling between the subscribers and information providers. The interface units frequency multiplex digital video information with voice information to the subscriber and support transmission of a reverse control channel from the subscriber to the central office for transmission back to the information provider. Several enhancements and special features are disclosed.

43 Claims, 15 Drawing Sheets

U.S. PATENT DOCUMENTS

| | | |
|---|---|---|
| 4,807,023 | 2/1989 | Bestler et al. |
| 4,829,372 | 5/1989 | McCalley et al. |
| 4,849,811 | 7/1989 | Kleinerman |
| 4,852,154 | 7/1989 | Lewis et al. |
| 4,890,320 | 12/1989 | Monslow et al. |
| 4,891,694 | 1/1990 | Way .................................. 348/7 |
| 4,897,867 | 1/1990 | Foster et al. |
| 4,949,187 | 8/1990 | Cohen |

(List continued on next page.)

OTHER PUBLICATIONS

Billing System" by Andrew Bulfer et al., NCTA Technical Papers (1986).

"BERKOM Test Network and BISDN/CATV Concept" by G. Domann, Electrical Communication, vol. 62, No. 3/4 (1988).

"A Store-And-Forward Architecture For Video-On-Demand Service"; A. D. Gelman, H. Kobrinski, L. S. Smoot, S. B. Weinstein; pp. 0842–0846 © 1991 IEEE.

"The British Telecom switched-star cable TV network"; W. K. Ritchie; British Technology Journal, vol. 2, No. 4, Sep. 1984; pp. 5–17.

"Video on Demand: A Wideband Service or Myth?"; C. N. Judice, E. J. Addeo, M. I. Eiger, H. L. Lemberg; pp. 1735–1739 © 1986 IEEE, ICC 1986.

"Video-On-Demand-A Traffic Model And Gos Technique"; S. Lederman; pp. 0676–0683, © 1986 IEEE, Globecom 1986.

"Single Mode Fiber Transport and Coaxial Distribution Of Video On Demand"; C. W. Lundgren, P. S. Natarajan; pp. 0889–0893, © 1986 IEEE, Globecom 1986.

"Analysis of Resource Sharing In Information Providing Services"; A. D. Gelman, S. Halfin; pp. 312–316; © 1990 IEEE, Globecom 1990.

"Video On Demand: Is It Feasible?"; W. D. Sincoskie; pp. 0201–0205, © 1990 IEEE, Globecom 1990.

"Progress in the Development of a High Data Rate, High Capacity Optical Disk Buffer"; Martin L. Levene; SPIE, vol. 1078, Optical Data Storage Topical Meeting (1989), pp. 106–111.

"Entertainment Video-on-Demand at T1 Transmission Speeds (1.5 Mb/s)"; C. N. Judice; pp. 396–397, SPIE vol. 1001 Visual Communications and Image Processing 1988; Bell Communications Research.

"Switched vs Broadcast Video For Fiber-To-The Home Systems"; F. Ray McDevitt and Dr. Joe Sutherland; 11 pages of text; © IEEE 1990 ICC 1990; Alcatel Network Systems.

"Experimental Approaches To Video Services And Technologies"; Howard E. Bussey; pp. 0901–0906; © 1986 IEEE, Globecom 86; Bell Communications Research.

"Personalized Services On the Intelligent, Wideband Network"; Stephen B. Weinstein; 6 pages of test, 1986.

"Wide-Band Interactive Services Experiment (WISE): A First Test of Future Video Services"; Alfredo de Bosio, Flavio Melindo, Agostino Moncalvo and Per Gieorgio Ricaldone; pp. 835–841, © 1985 IEEE, IEEE Journal on Selected Areas in Communication, vol. Sac-3, No. 6, Nov. 1985.

"An Approach to the Multifunction Graphic Terminal for the ISDN Environment"; Takashi Komiya, Yasunobu Suzuki, Hajime Yamada and Keiko Tomita; pp. 0032–0036, © 1988 IEEE; Globecom 1988; OKI Electric Ind. Co., Ltd. ISDN Development Division.

"Low-Cost Digital Passive Optical Networks"; A. R. J. Cook, D. W. Faulkner, P. J. Smith, R. A. Lobbett; pp. 0659–0662, © 1990 IEEE; ICC 1990; British Telecon Research Lab.

"ATV Multiport Receiver An Overview of the EIA ATV Technical Subcommittee Work"; Arpad G. Toth, Joseph Donahue; 18 pages of text, EIA Digital ATV Workshop; Nov. 7, 1989.

"Optical Networks for Local Loop Applications"; David W. Faulkner, David B. Payne, Jeffrey R. Stern and John W. Ballance; pp. 1741–1751, © IEEE 1989, Journal of Lightwave Technology, vol. 7, No. 11, Nov. 1989.

"Passive Optical Subscriber Loops With Multiaccess"; Yih-Kang, Maurice Lin and Dan R. Spears; pp. 1769–1777, © 1989 IEEE, Bellcore; Journal of Lightwave Technology; vol. 7, No. 11 Nov. 1989.

"Comparison of Discrete Cosine Transform and Vector Quantization of Medical Imagery"; Barry G. Haskell and Hsueh-Ming Hang; pp. 399–408, SPIE vol. 626 Medicine XIV/PACSIV (1986).

"Distributed Desktop Conferencing System (MERMAID) Based on Group Communication Architec- (List continued on next page.)

U.S. PATENT DOCUMENTS

| | | |
|---|---|---|
| 4,995,078 | 2/1991 | Monslow et al. |
| 5,010,399 | 4/1991 | Goodman et al. |
| 5,014,125 | 5/1991 | Pocock et al. |
| 5,130,792 | 7/1992 | Tindell et al. |
| 5,132,992 | 7/1992 | Yurt et al. |
| 5,133,079 | 7/1992 | Ballantyne et al. |
| 5,198,899 | 3/1993 | Cang ............................................. 348/7 |
| 5,247,347 | 9/1993 | Litteral et al. |

OTHER PUBLICATIONS ture"; Kazutoshi Maeno, Shiro Sakata and Toyoko Ohmori; pp. 0520–0525, © IEEE 1991; ICC 1991.

"Video Services on Copper"; Milton M. Anderson; pp. 0302–0306, © IEEE 1991; ICC 1991.

"System Architecture for a Large Scale Video on Demand Service"; W. D. Sincoskie; Computer Networks and ISDN Systems 22 (1991); pp. 155–162; © 1991 Elsevier Science Publishers.

"To PON or not to PON? That is the question"; John S. McConnell; 4 pages of text Telephony–Jan. 14, 1991.

"Break on Through to the Other Side"; George T. Hawley; 7 pages of text Telephony–Jan. 14, 1991.

Joseph W. Lechleider, "High Bit Rate Digital Subscriber Lines: A Review of HDSL Progress," *IEEE Journal on Selected Areas in Communications,* vol. 9, No. 6, Aug. 1991, pp. 769–784.

Earl E. Manchester, "New Uses for Residential Copper," *Telephony,* Jun. 10, 1991, pp. 27, 28 and 32.

Waring et al., "Digital Subscriber Line Technology Facilitates a Graceful Transition from Copper to Fiber," reprinted from *IEEE Communications Magazine,* vol. 29, No. 3, Mar. 1991.

"HDTV and Fiber Optic Communications–An Opinion"; Arpad G. Toth; pp. 1–11, Phillips Laboratories, North American Philips Corp., Briarcliff Manor, N.Y., EIA Digital ATV Workshop, Nov. 1989.

"Integrated Voice, Data, and Video In the Local Loop"; Neale C. Hightower; pp. 0915–0919, © 1986 IEEE, Globecom 1986.

"Heathrow–Experience and Evolution"; John Bourne, Mark Balmes, Jim Justice; pp. 1091–1095, © 1990 IEEE, ICC 90.

"The Heathrow Broadband Access System"; Alan F. Graves; pp. 1675–1679, © 1989 IEEE, Globecom 1989.

"Customer–Controlled Video Switching For Teleconferencing"; Keith J. Allen and Thomas K. Helstern; pp. 0907–0914, © 1986 IEEE, Globecom 86, Bell Communications Research.

"Narrowband and Broadband ISDN CPE Directions"; Daryl J. Eigen; pp. 39–46, © 1990 IEEE Communications Magazine.

"Multimedia Document Structure for Dialog Communication Service"; Naoki Kobayashi, Toru Nakagawa; pp. 0526–0531, © 1991 IEEE, ICC 91, NTT Human Interface Laboratories.

"A Proposal of Multimedia Document Architecture and Video Document Architecture"; Wataru Kameyama, Tsuyoshi Hanamura, Hideyoshi Tominaga; pp. 0511–0515, © 1991 IEEE, ICC 91, Dept. of Electronics and Communication Engineering WASEDA University.

"Object Representation For Multimedia Document Interchange"; Magda M. Mourad; pp. 0532–0539, © 1991 IEEE, ICC 1991; IBM Thomas J. Watson Research Center.

"Evolutionary Architectures and Techniques for Video Distribution on Fiber"; Stuart S. Wagner, Ronald C. Menendez; pp. 17–25, © 1989 IEEE; IEEE Communications Magazine Dec. 1989.

"Technologies Towards Broadband ISDN"; Kazuo Murano, Koso Murakami, Eisuke Iwabuchi, Toshio Katsuki, Hiroshi Ogasawara; pp. 66–70 © 1990 IEEE; IEEE Communications Magazine.

"Can PON go broadband?"; Carl P. Engineer; 3 pages of text, Telephony–Jan. 14, 1991.

"Television Coding For Broadband ISDN"; Jules A. Bellisio and Shuni Chu; pp. 0894–0900, © 1986 IEEE; Globecom 86; Bell Communications Research, Inc.

Stanford University, Study Project: "Performance Evaluation of a Multichannel Transceiver System for Asymmetric Digital Subscriber Lines," dated Dec. 12, 1990, distribution to American National Standards Institute T1E1.4 Technical Subcommittee Working Group Members (partial copy).

Bellcore, Technical Memorandum, "Asymmetrical Digital Subscriber Lines", TM-TSY-015008, completion date Sep. 14, 1989.

VIDEO-ON-DEMAND SERVICES USING PUBLIC SWITCHED TELEPHONE NETWORK

CROSS-REFERENCE TO RELATED APPLICATIONS

This application is a continuation-in-part of application Ser. No. 07/766,535, filed on Sep. 27, 1991, entitled PSTN ARCHITECTURE FOR VIDEO-ON-DEMAND SERVICES, now U.S. Pat. No. 5,247,347.

TECHNICAL FIELD

The invention relates to a network for delivering television programming to subscribers over a Public Switched Telephone Network (PSTN), and more particularly to network architecture for transmitting television programing from video information providers (VIPs) over twisted copper wires or other medium to subscriber premises.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were made available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The descramblers are tuned to receive only premium channels, descramble the video and audio information and supply a signal capable of reception on a standard television set.

Pay-per-view programs, which evolved later, include recently released movies, live concerts and popular sporting events. Subscribers wishing to view a pay-per-view program place an order with the cable operator. At the designated time, the subscriber's descrambler is activated to permit viewing of the pay-per-view programming. However, the subscriber is restricted to viewing the programming at the scheduled time. There is no capability of delivering programming to a subscriber on demand, that is, immediately or at a subscriber-specified time and date.

In the early 1980s, technological advances resulted in the proliferation of Video Cassette Recorders (VCR), establishing a second course for video programming distribution. Pre-recorded video programs are now available for sale and rental to VCR owners. Using a VCR, the viewer selects from among many titles available for sale and rental, and views the program when convenient. The VCR owner further has the capability to selectively view the programming using special functions of the VCR, such as pause, fast forward, reverse, slow motion, etc. The viewer can thus manipulate and replay portions of the program at will.

The penalty for this convenience, however, is in the necessity to travel to the local video rental/sales store, if necessary wait for a popular video program tape to become available, once the program is obtained return home to view it and then revisit the video store to return the tape.

Telephone lines have been suggested as an alternative means of video distribution in Goodman et al., U.S. Pat. No. 5,010,319 and Kleinerman, U.S. Pat. No. 4,849,811. However, systems using the public switched telephone network (PSTN) are often bandwidth limited, providing only still frame or video conferencing capabilities. Because telephone system carriers for the most part use the PSTN only for connectivity between subscribers, there is no capability for dynamic routing of digitized video without dedicated leased, wide bandwidth circuits. Telephone line based systems also fail to provide acceptable VCR type functional control of the programming.

Copending application Ser. No. 07/766,535, filed by the assignee of the present invention on Sep. 27, 1991, entitled PSTN ARCHITECTURE FOR VIDEO-ON-DEMAND SERVICES and upon which the present invention is an improvement, describes a so-called Video-on-Demand service that provides video programming to subscribers over the PSTN. A menu of video programming information is accessible at the subscriber's premises. The subscriber may transmit ordering information via the PSTN to the independent video information providers. Video programming may be accessed and transmitted to the subscriber directly from a video information provider (VIP) or through a video buffer located at a central office (CO) serving the subscriber.

The VIP transmits coded digital video data over wideband PSTN supplied connectivity to a central office. The video data may be buffered at the central office for transmission over a POTS line to the subscriber. A subscriber may use either a standard telephone instrument over the PSTN or a dedicated control device over an ISDN packet network to order the video programming. Such a device is located at a television set of the subscriber and permits a display of the program menu on the television screen.

Connectivity between the central office and the subscriber for transmission of video data is provided by an asymmetrical digital subscriber line (ADSL) system. ADSL interface units perform multiplexing of digital video information with voice information to be transmitted to the subscriber and support transmission on the ISDN packet data network of a reverse control channel from the subscriber to the central office.

However, video-on-demand service does not include an integral library of video program material, hence enabling only limited storage capabilities for video and audio data supplied by a VIP. Enhanced functionality is required to efficiently support multiple program storage. Furthermore, to support network management, a need remains for a system which dynamically interacts with network facilities to reconfigure network resources in real-time and in response to information requests.

Furthermore, certain operational enhancements have been found to be desirable in the video-on-demand service described in the aforementioned parent application. For example, it is occasionally desired to order a video program from the subscriber's office to be played later at the premises of the subscriber. On the other hand, the subscriber must be home and remember to turn a decoder on at the reserved time, to watch the requested program. If not, the subscriber will not have the opportunity to view the selection but will be charged for it anyway. Hence, it would be desirable to transmit the program and enable a charge to be incurred only if it can be determined that the subscriber is going to view the program.

In accordance with video-on-demand service as described in the copending application, the subscriber can order any programming from the video information provider through the telephone keypad or remote control unit. However, the unrestricted ability of anyone at the subscriber's residence to place an order for any programming is undesirable, for example, where children are involved. It would be desirable to restrict the ability of viewers to order only those types of programming they are permitted to view.

Accordingly, a broad object of the invention is to implement video programming on demand using components of the PSTN.

Another object of the invention is to enable access by a telephone subscriber to multiple sources of video programming over the PSTN.

Still another object of the invention is to enable subscribers of the PSTN to have real time control of video programming delivery to their television sets.

Another object is to enable a subscriber to select video programming from a remote location and receive the selection at the subscriber's premises.

A further object of the invention is to ensure that the video program decoder at the subscriber's premises is turned on before a previously ordered selection is transmitted.

Still another object is to establish service constraints that prevent an unauthorized requester, e.g., a child at the subscriber's premises, from ordering restricted programming.

DISCLOSURE OF THE INVENTION

In accordance with this invention, a central office based public switched telephone network for supplying video information from a digital information storage medium to designated subscriber premises comprises subscriber loop transmission means for transferring (1) selected video information from a central office to the subscriber premises, (2) subscriber order data from the subscriber premises to the central office location, and (3) telephone service signals between the subscriber premises and the central office. A switch at the central office receives the subscriber order data from the subscriber loop transmission means. A video gateway in turn is responsive to the subscriber order data from the switch for producing video routing data. A file server, responsive to requests received from the video gateway, obtains selected video information from the digital information storage medium. A cross-connect switch in turn is responsive to the video routing data for transferring the video information from the file server to the subscriber loop transmission means.

In accordance with another aspect of the invention, the file server includes user request processing means responsive to user request data for supplying information request data, and session control means responsive to the information request data for supplying information retrieval data and output control data. A video information storage means is responsive to the information retrieval data for supplying video information. An output control means in turn responds to the output control data for transferring the selected video information from the video information storage means.

In accordance with a further aspect of the invention, the gateway includes means for restricting selection of video information by particular users. Preferably, the restricting means includes a data base stored at the gateway.

Another feature of the invention is a means for sending a ready signal from a subscriber premises to the gateway indicating that the subscriber is ready to receive a video information selection. Another means transfers selected video information to the requesting subscriber only upon receipt of the ready signal.

As a still further feature of the invention, the subscriber premises includes a video signal decoder, and the ready signal is transmitted to said gateway automatically when the decoder is turned on. Preferably, the gateway includes means for storing the ready signal.

The above and other objects, features and advantages of the present invention will become apparent from the following description taken in conjunction with the accompanying drawings.

BEST MODE FOR CARRYING OUT THE INVENTION

Figure 1:
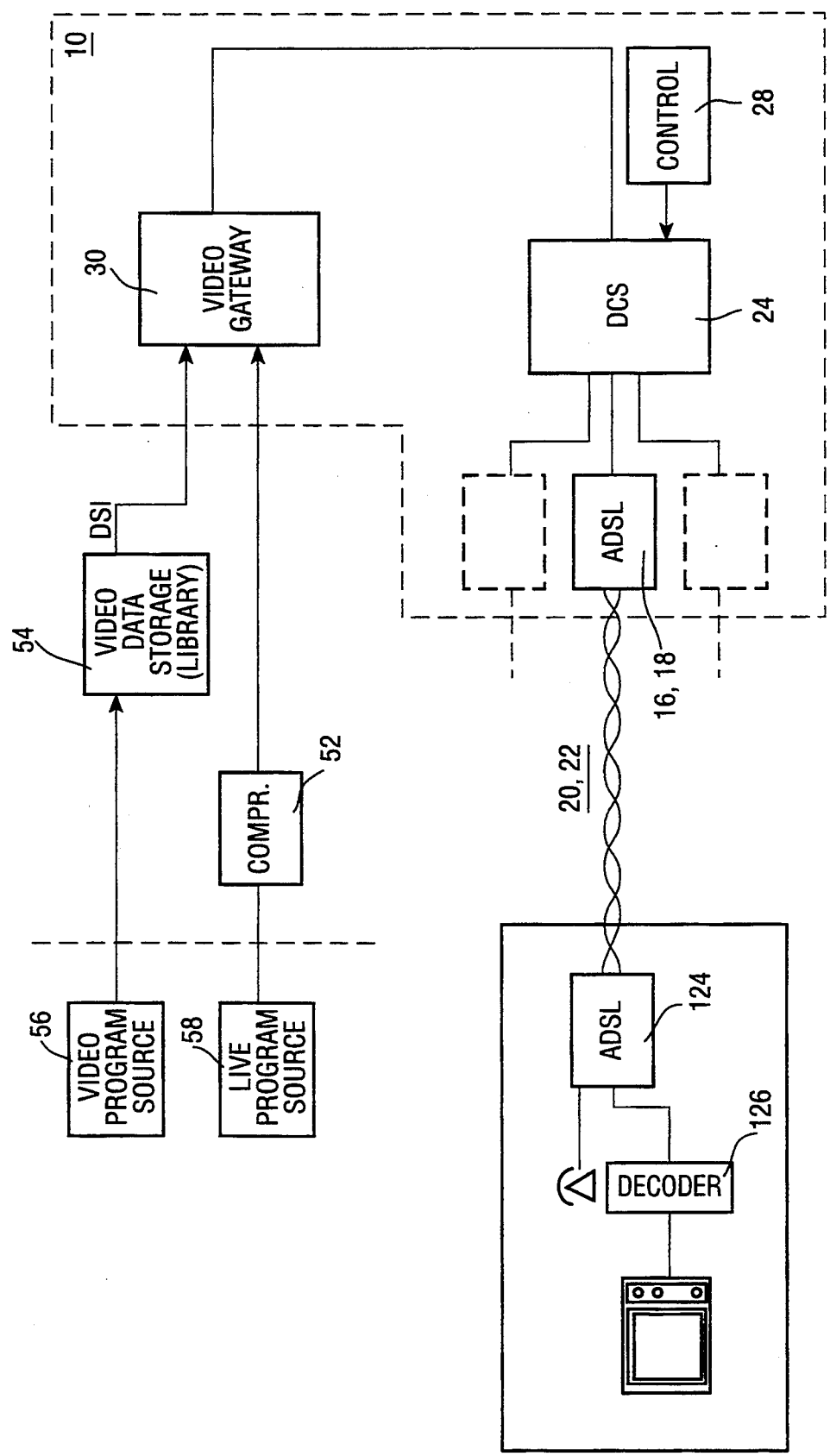
FIG. 1 is a generalized system diagram showing video data flow from a video information source to a subscriber.

As an overview of the improved video-on-demand service upon which an aspect of the invention is based, a video-on-demand service platform shown in FIG. 1 is of the type described in copending application Ser. No. 07/766,535, filed on Sep. 27, 1991 and entitled PSTN ARCHITECTURE FOR VIDEO-ON-DEMAND SERVICES. The platform adopts existing components of the Public Switched Telephone Network (PSTN) and implements compression techniques to store video information for subsequent forwarding over interoffice facilities. The switching facilities are located in central offices (COs) 10 serving residential customers or subscribers. Loop electronic devices modify the transmission characteristics of the local copper loop to provide required enhancement to the PSTN and permit delivery of full motion video information.

Analog video information is first converted to a digital format using encoding techniques compatible with decompression algorithms now existing and being developed and standardized by the International Standards Organization (ISOs) Motion Picture Experts Group (MPEG). In FIG. 1, the information is derived from a video program source 56 that may represent an incoming transmission from a satellite or the like or a live source 58. The information received from source 56 preferably is previously compressed off-line or may be compressed on-line by compression circuitry, not shown. The information from live program source 58 preferably is compressed by on-line compression circuitry 52.

The information received from source 56 is assigned a title. Each title corresponds to video and accompanying audio information stored as an addressable data file in conventional data processing devices performing the function of a video library. These files, as well as live source programming, are passed through a video gateway 30 residing at central office 10 to subscribers.

The operations of establishing and monitoring connections linking a video library port transmitting selected information with the end user ports receiving the information are performed by a supervisory controller 28 to control electronic digital cross-connect switches (DCS) 24 that reside in a central office 10 within the PSTN. An example of a suitable controller 28 is a network management software package, such as MegaHub BASIS (TM) Controller by Digital Switch Corporation. The DCS 24, also used for switching two-way DS-1 rate transmissions, is adapted to additionally provide bridging or broadcast of video information to several subscribers.

Normal "data session" control between a video library port and a port providing access to the video-on-demand equipment is one of the functions performed by a central processing unit (not shown) in the video library. The network control software and an adjunct processor (also not shown) at the central office 10 control the "network session" between the video-on-demand access port and user ports. The adjunct processor also maintains a record of relevant data regarding each session which is forwarded to a subscriber billing system.

Customer local loops 20, 22, equipped with Asymmetric Digital Subscriber Line (ADSL), devices 16, 18, 124 are connected to the DCS 24 through CO side ADSL devices 16 or 18. One-way 1.544 megabit per second (mbps) signals are transported over the same twisted pair transmitting voice messages to the residential subscriber. The ADSL transported signal is demultiplexed, and the 1.544 portion decoded by a conventional decoder 126 using MPEG standard techniques to deliver a full motion video signal.

Figure 2:
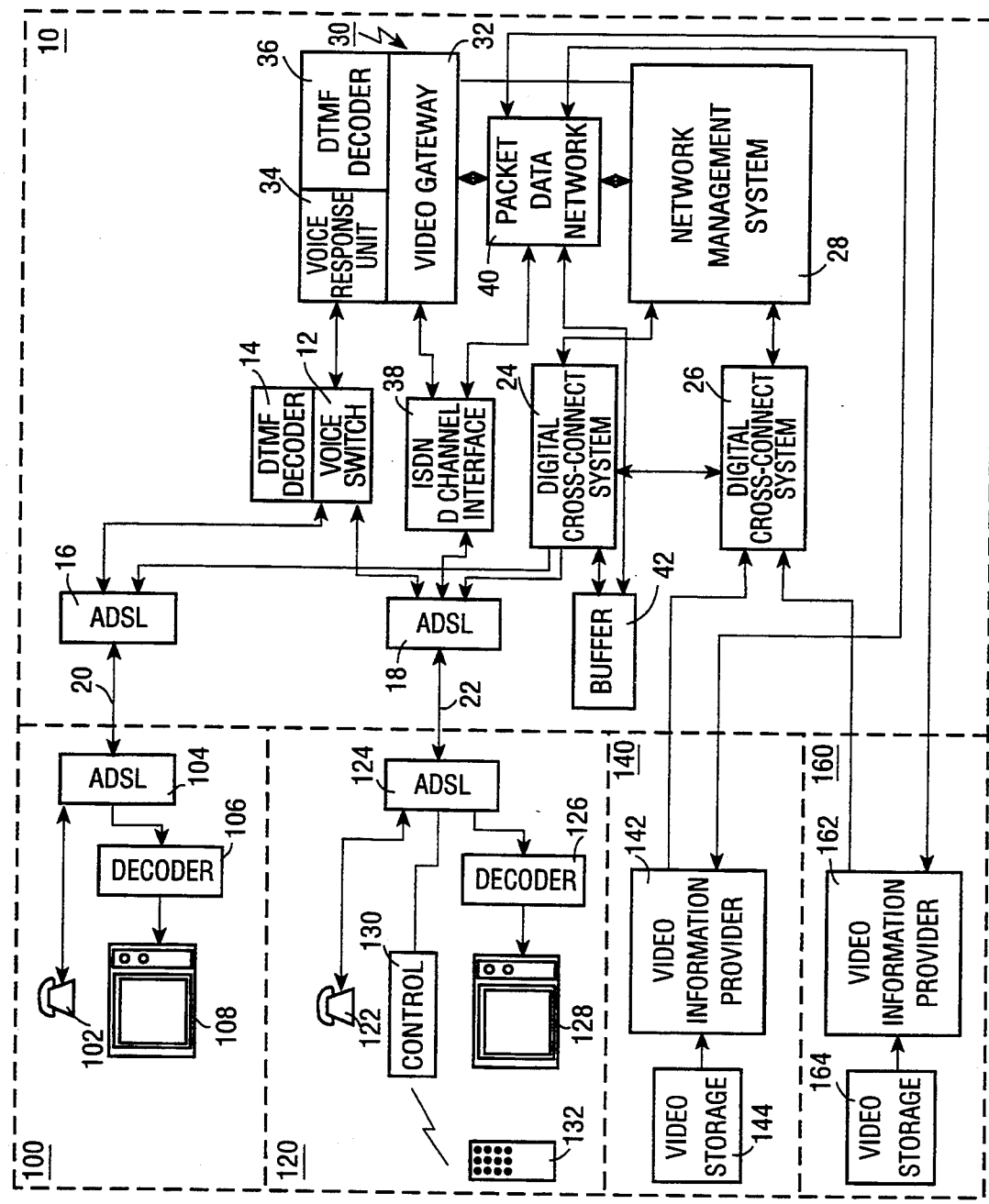
FIG. 2 is a block diagram of a video-on-demand system as described in the parent application.

Referring to FIG. 2, the video-on-demand service, residing on the platform of FIG. 1, is shown in greater detail. Subsequent figures depict various improvements thereto. The central office 10 provides video/audio connectivity from VIPs 140 and 160 selectively through the system to subscribers 100 and 120. CO 10 includes a conventional voice switch 12 which includes components to detect off-hook, service requests, call completion (i.e., ring trip), a DTMF decoder 14 and dial pulse detector. Voice switch 12 also includes a telephone call connection switch for routing voice circuits among the various ports.

Connected to voice switch 12 are ADSL equipment 16 and 18 for multiplexing (i) voice and signaling information from voice switch 12 and (ii) digital video/audio information from DCS 24 onto respective subscriber local loops 20 and 22. Digital compressed video and audio data from video information providers (VIPs) 140 and 160 is supplied to DCS node 26. The two video information providers 140, 160 shown in FIG. 2 correspond to elements 52-58 and have information storage units 144 and 164 that constitute the video data library 54 of FIG. 1.

Two subscriber premises configurations 100 and 120 are shown in FIG. 2. In subscriber premises 100, video orders are placed using standard POTS service provided with telephone instrument 102 interfaced through subscriber ADSL interface 104 to voice switch 12. A subscriber at premises 100 requests the transmission of video data using telephone instrument 102 by dialing Voice Response Unit (VRU) 34 of video gateway 32 through voice switch 12.

Under control of Network Management System 28, connectivity is established between DCS node 26 and DCS node 24. Output nodes of DCS 24 provide the digital video/audio data to selected ADSLs 16 and 18 for transmission to subscriber premises 100 and 120.

Figure 3:
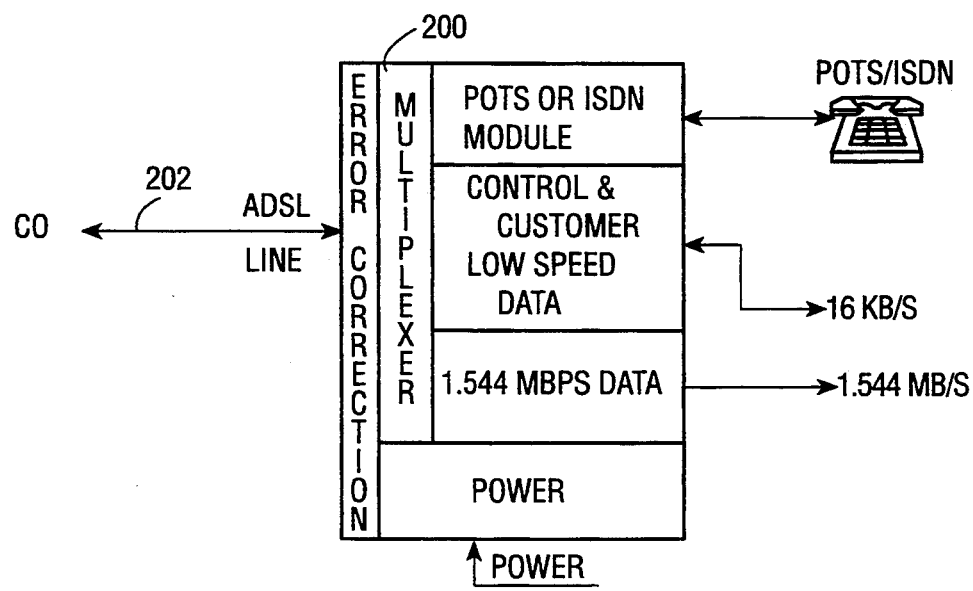
FIG. 3 is a functional diagram of an asymmetrical digital subscriber line unit (ADSL) shown in FIG. 2.
Figure 4:
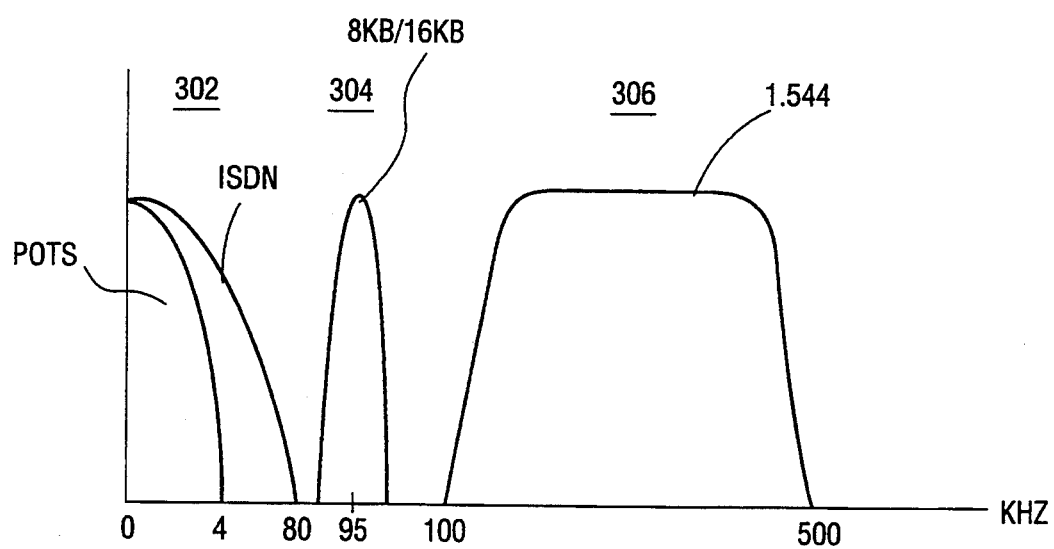
FIG. 4 is a frequency domain diagram showing channelization of a local loop in the system.

ADSLs 16 and 18 (these units are shown in more detail in FIGS. 3 and 6), carry out error correction and multiplex data on subscriber loops 20 and 22 using frequency multiplexing to divide the available loop bandwidth into three channels 302, 304 and 306 (see FIG. 4). Base band audio and signaling below 4 kilohertz (kHz) provide connectivity for a conventional telephone services available on the "plain old telephone system" (POTS). Alternatively, ISDN channel requirements consume the bottom 80 kHz of loop bandwidth. Reverse channel digital packet information, centered on 95 kHz., provides 8 kilobits per second (kbps) of handshaking protocol between the customer- and trunk-side ADSLs 16, 18 and 104, 124 to test the copper pair transmission path, and approximately 16 kbps connectivity from the subscriber premises to a packet switched network, such as the ISDN network over a D-channel interface. The 16 kbps signal is stripped by the ADSL 16, 18 and sent to the CO 10. Compressed digital video information is contained within the frequency range of about 100 and 500 kHz to provide a 1.6 mbps channel for transporting video/audio data over respective loops 20 and 22 to customer premises 100 and 120.

The frequency channel represented by range 302 in FIG. 4 thus establishes a 2-way channel used to provide standard POTS service or ISDN (2B+D) service over the ADSL line. Channel 304 is an up-stream only (subscriber to CO), low speed data channel. Eight kbps of this channel is used for transfer of operations, administration, maintenance, and provisioning (OAM&P) data for the ADSL unit. The remaining 16 kbps, compatible with D channel interfaces of BRI-ISDN, as shown in FIG. 1, or with X.25 protocol, is used to interface with an ISDN or X.25 packet switch for allowing the subscriber to interact with the network and/or the 1.544 mbps signal provider.

Channel 306 carries a down-stream only (CO to subscriber) digital signal providing 1.544 mbps transport for carrying the digitized compressed video signal. The lower edge of channel 306 is set at 100 kHz., chosen to minimize channel loss and allow appropriate bandwidth for base band channel 302 and reverse channel 304 and to minimize interference from impulse noise. The combined digital down-stream signal utilizes the DS1 bit map specified by ANSIT1.403-1989.

A down-stream control signal to the subscriber (not shown in FIG. 4) is time division multiplexed with the 1.544 mbps video signal on the 100–500 Hz. carrier. This down-stream control signal, together with the digitized compressed video signal and overhead, occupies a bit rate band of about 1.6 mbps. All necessary multiplexing and demultiplexing of the telephone service, control and video information signals in the frequency and time domains are carried out by the ADSL units 16, 18 and 104, 124.

Because data channels 304 and 306 are unidirectional, the system does not experience self-NEXT (near end cross-talk). This allows concentration on the interface and interference from impulse noise because the ADSL system is loss-limited rather than NEXT limited. Impulse noise exposure can be reduced by using a pass band technique as opposed to a base band approach since impulse noise affects are greatest below 40 kHz. Therefore, a modulation technique such as base band Quadrature Amplitude Modulation (QAM) or descrete multitone (DMT) is preferred over a 2B1Q base band system.

ADSL multiplexer 200 shown in FIG. 3, in combination with ADSL line 202, supports transmission of a one-way 1.544 mbps digital signal along with a POTS or a BRI-ISDN signal over a single non-loaded copper pair. This configuration provides service to a customer over copper loop lengths of up to 18,000 feet, conforming with Carrier Serving Area (CSA) and resistance design rules. Alternatively, transport may take place over a radio frequency link or using cellular transmission. The signalling bands may all be tranported on the same medium, or may be mixed. For example, telephone service signals may be transmitted on copper wires, and the control and video signals by radio frequency. For brevity, ADSL units operating only in a transport environment of twisted wire will be described hereinafter.

Figure 6:
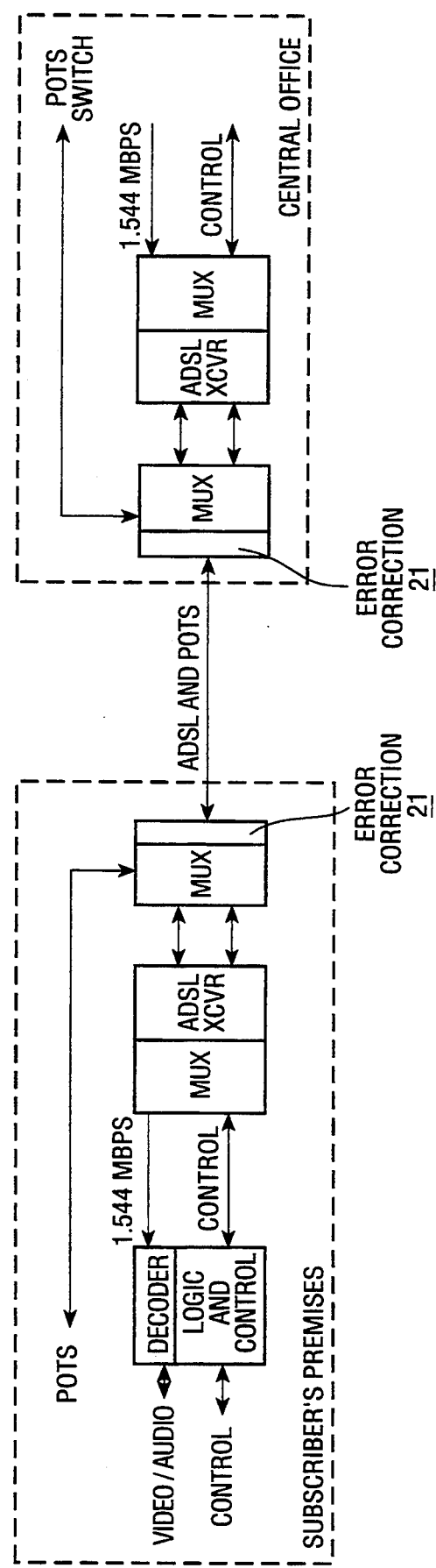
FIG. 6 is a hardware block diagram of the ADSL of FIG. 3 configured to provide simplex high-bit-rate access and POTS on a common copper loop.
Figure 7A:
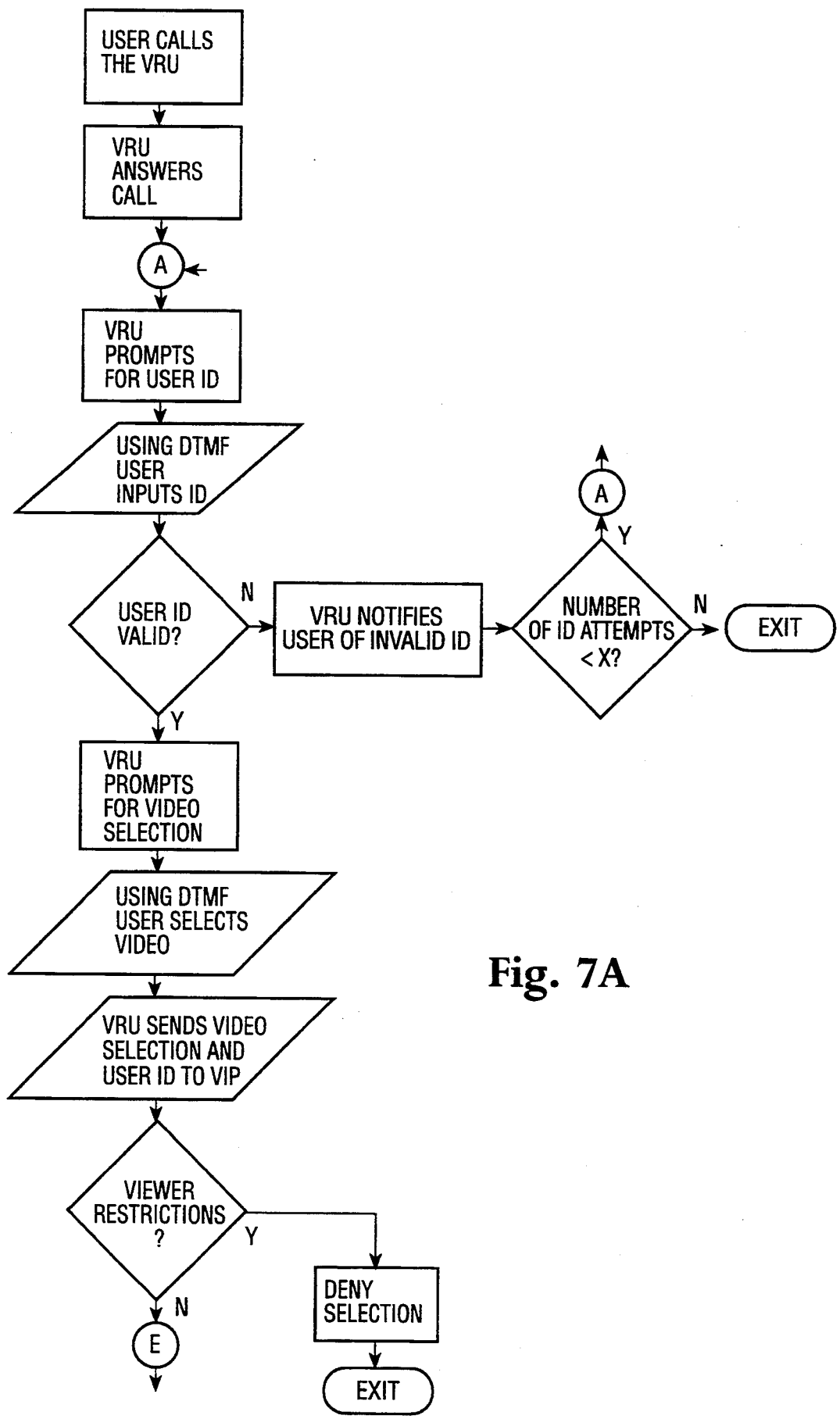
FIGS. 7A through 7D together form a flow diagram of gateway protocol for accepting subscriber video orders from local or remote locations, including implementation of program restrictions in accordance with an aspect of the invention.
Figure 7B:
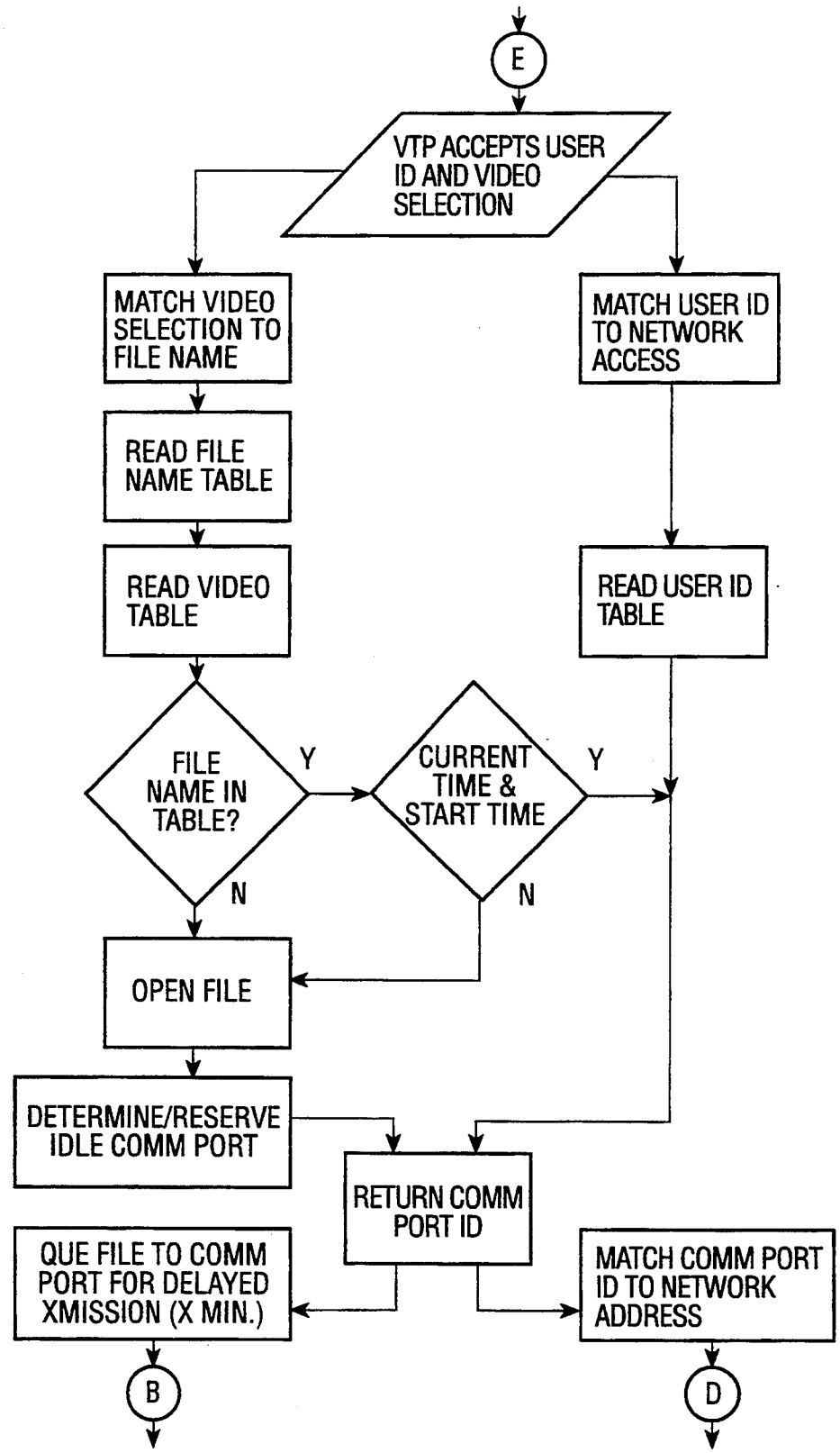
Figure 7:
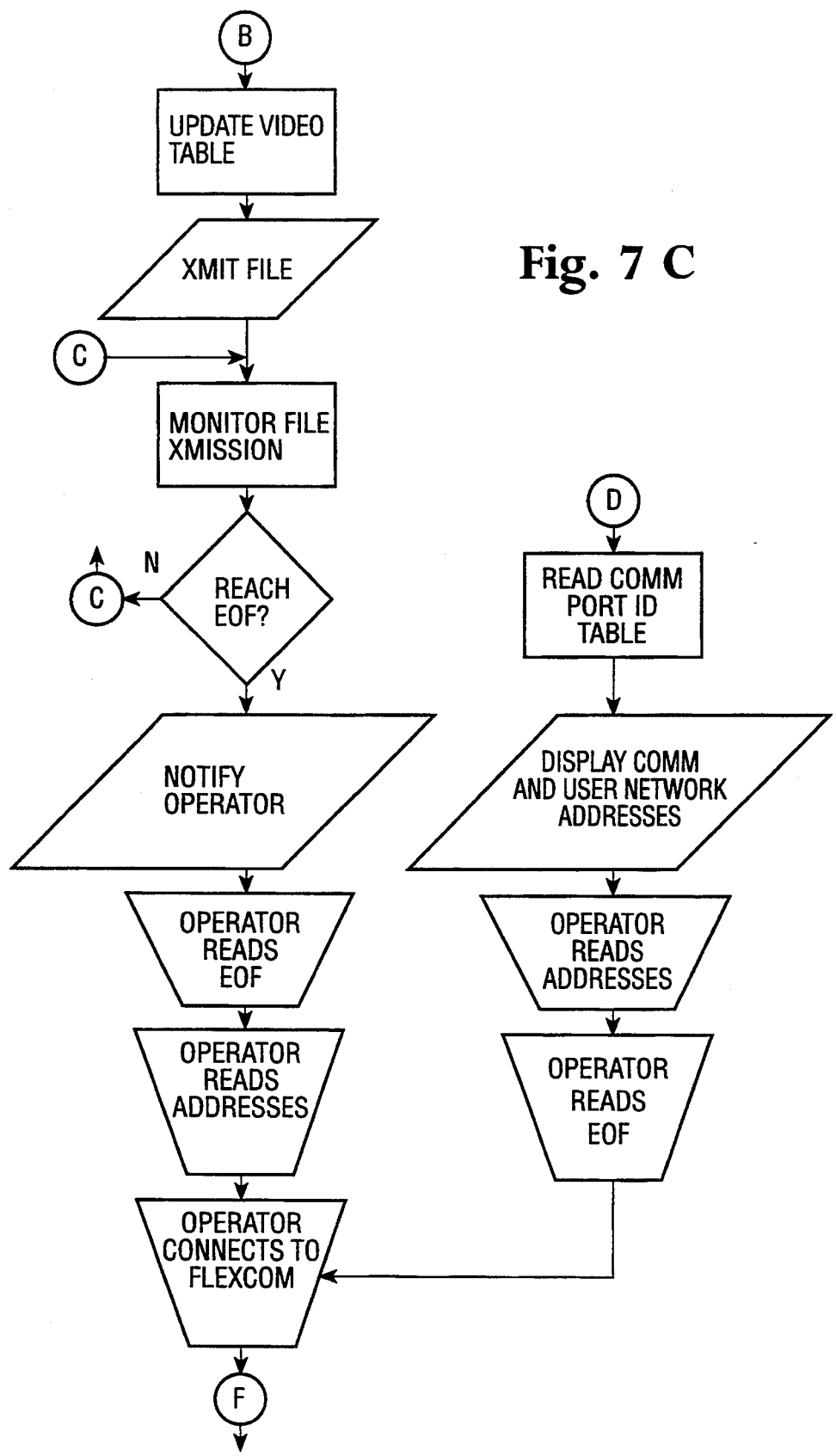
Figure 7:
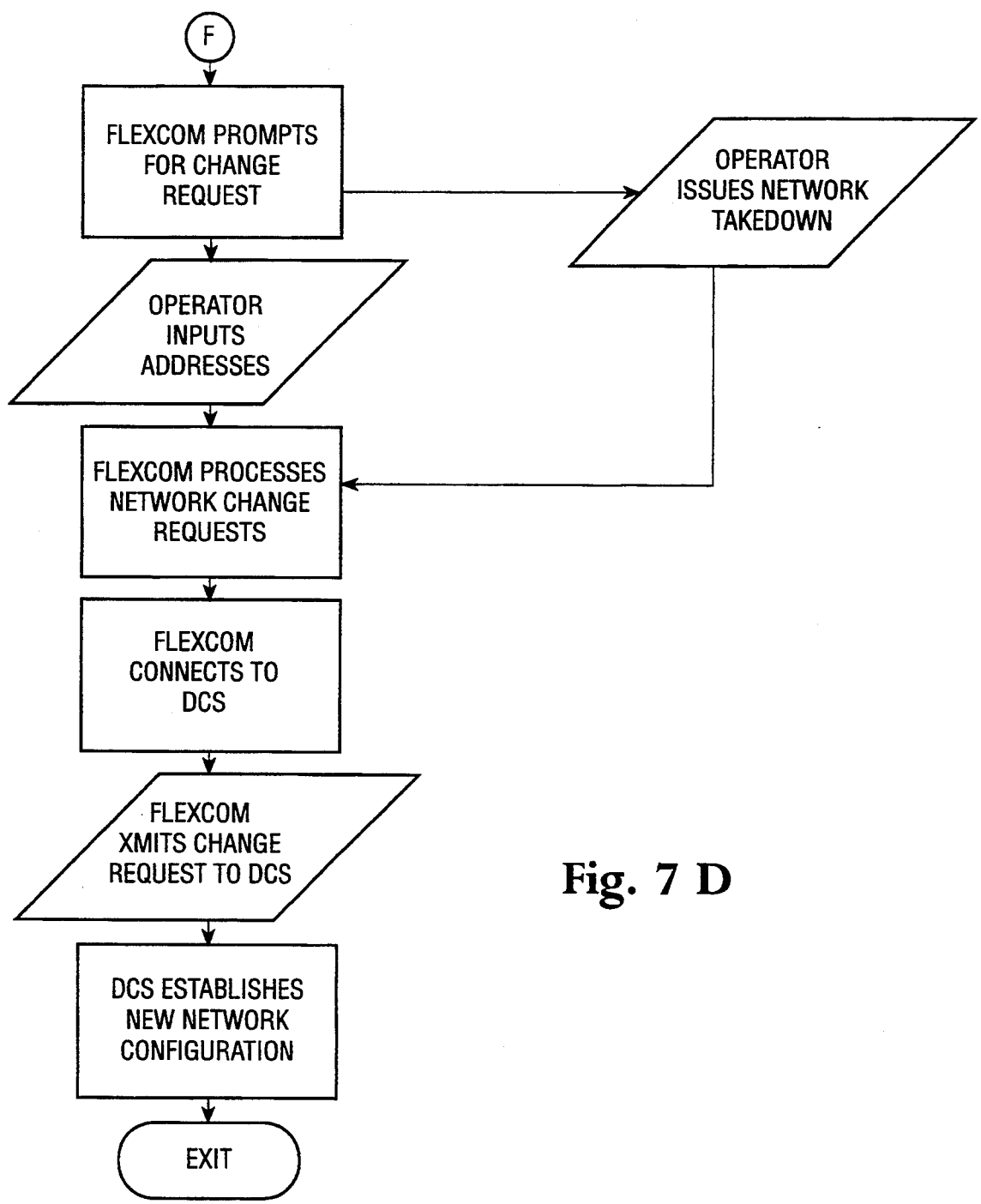

The ADSL system (the hardware block diagram is shown in FIG. 6) provides simplex high-bit-rate video data and POTS connectivity to a subscriber over a common copper loop with transport capability to deliver a one-way high-bit-rate data stream with POTS or ISDN basic access multiplexed at baseband. Each ADSL on the subscriber- and CO- sides includes an error correction circuit 21 implementing an error correction algorithm, such as the Reed-Sullivan algorithm, for correcting errors that arise as a result of transmission of data on a twisted pair of copper lines. The subscriber- and CO-side ADSLs on opposite ends of the twisted copper pair carry out "handshaking" while implementing the algorithm to reduce error in the video signal to a minimum.

Figure 9:
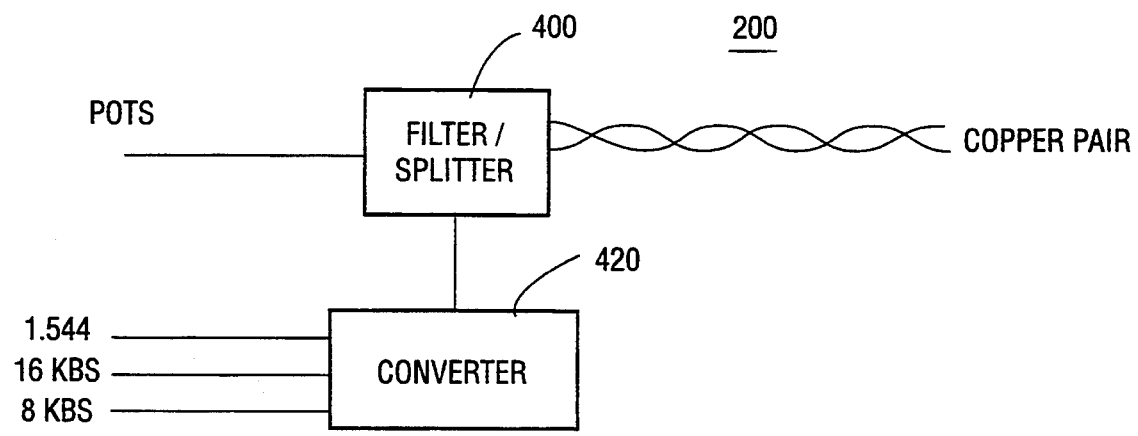
FIG. 9 is a block diagram of a signal splitter and converter circuit used at the premises for processing signals at the copper pair.

Referring to FIG. 9, the multiplexer 200 residing in each subscriber-side ADSL includes, in addition to a frequency converter 420 for channelizing the incoming signal into 1.544 Mbps, 16 Kbs and 8 Kbps components, a splitter/filter 400 for separating the standard POTS signal from the video composite. Hence, the video component incoming on the twisted copper pair is transparent to a standard phone resident on the line at the usual network interface device (NID).

Although FIG. 9 depicts the splitter/filter 400 and converter 420 in the form of separate units, the two can be combined with a converter as a single unit residing outside the ADSL enclosure. Alternatively, the converter 420 and decoder 126 can occupy a common enclosure, and the splitter/filter 400 arranged as part of the NID at the subscriber's premises.

Figure 5:
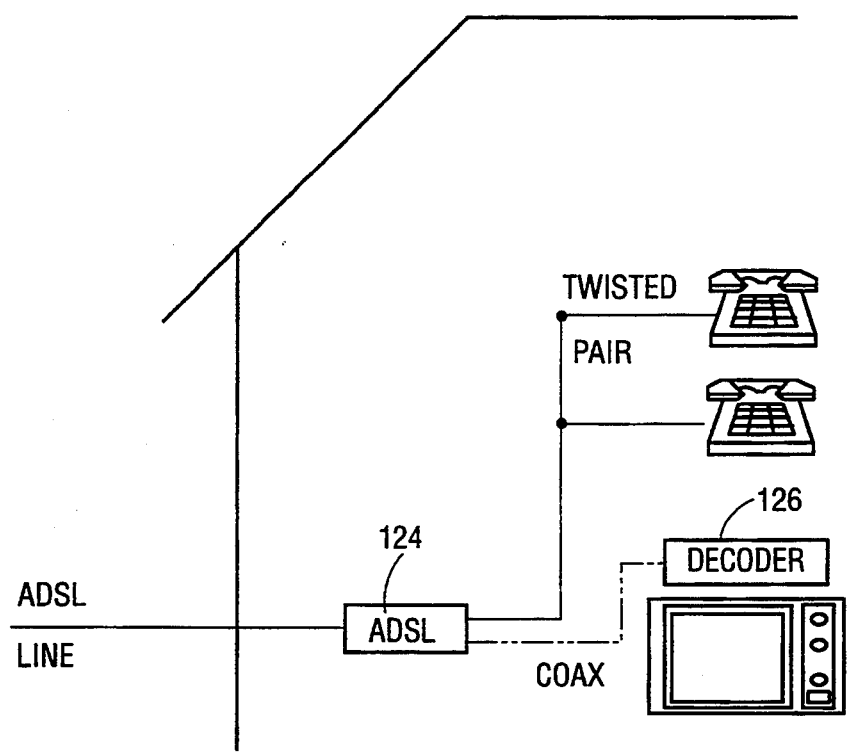
FIG. 5 shows a typical in-the-home configuration providing video transported over a 1.544 MBPS channel overlaid with standard telephone service signaling in the system.

FIG. 5 shows a typical in-the-home configuration which provides video transported over the 1.544 mbps channel. The unidirectional 1.544 mbps signal carried by the ADSL system has either a Superframe Format (SF) or an Extended Superframe format (ESF). The Superframe format consists of 24 consecutive 8-bit words preceded by one bit, called the framing bit (F-bit), for a total of 193 bits per frame. The F-bit is time-shared to synchronize the ADSL interface equipment and to identify signaling framing. Twelve consecutive frames form a Superframe. A line code used with a Superframe format is bi-polar return-to-zero, also known as Alternate Mark Inversion (AMI).

The ESF format consists of 24 consecutive frames, each of which includes 192 information bits preceded by 1 F-bit for a total of 193 bits per frame. The F-bit is used for basic frame synchronization, a cyclic redundancy check and a data link. Twenty-four frames form a Superframe. The line code used with the ESF is either AMI, bi-polar 8-zero substitution (B8ZS), or AMI with Zero-Byte Time Slot Interchange (ZBTSI).

Subscriber and CO ADSL interface units 16, 104 and 18, 124 (FIG. 2) are synchronized to ensure that both subscriber and CO side units derive timing from one master clock to prevent data loss. Preferably, the units derive timing from the incoming 1.544 mbps signal. Subscriber end ADSL equipment is powered locally from the customer premises; CO end ADSL equipment is preferably powered by an external source of DC input voltage in the range of between −42.5 and −55 VDC.

Figure 8:
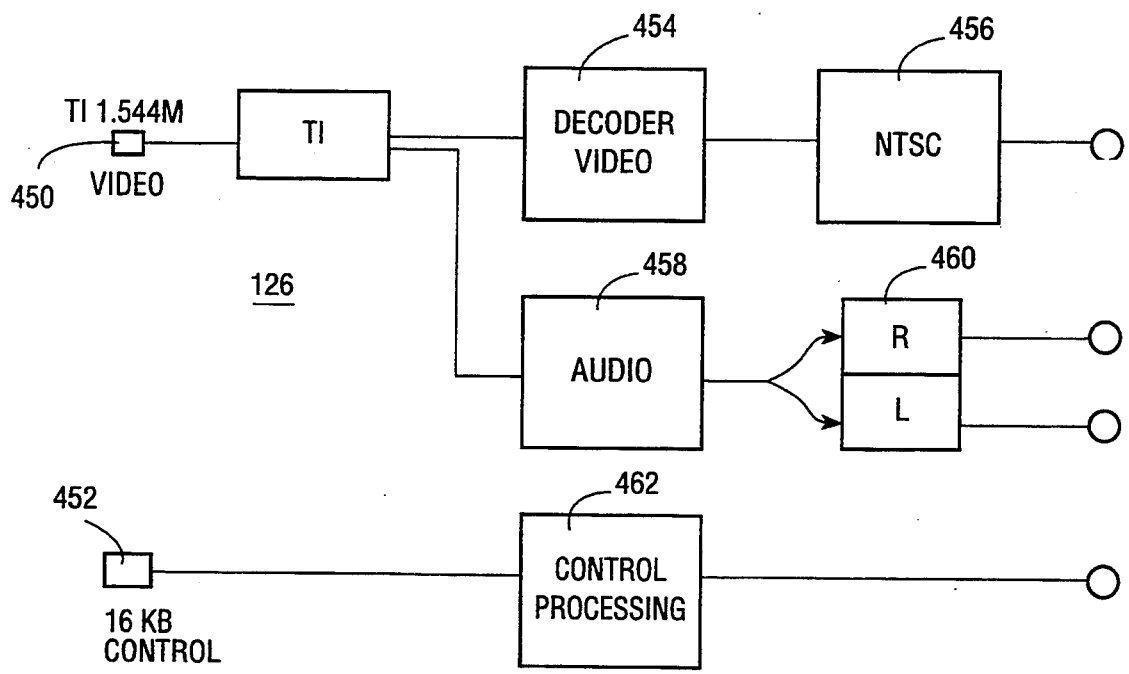
FIG. 8 is a diagram of a decoder unit resident at the subscriber's premises as used in the invention.

The MPEG decoder 126, shown in more detail in FIG. 8, includes a T1 input 450 for high speed data, preferably at 1.544 mbps and of DS1 format, and an input 452 for a control signal of bit rate of up to 16 kbps. The control signal is applied to known MPEG control processing circuitry 462. The video signal applied to input 450 is decoded by video decoder 454 to produce an NTSC base band signal to be supplied to an output port, as shown, such as an RCA jack. The output signal in turn is applied to the video terminals of a television, preferably within a frequency bond corresponding to channel 3 or 4.

The audio component derived from the video signal using conventional signal manipulation is applied to audio processing circuit 452 to attain right and left channel audio components represented by block 460 for supply to a stereo amplifier (not shown). Alternatively, the audio and video components can remain synchronized and be supplied to the television through a conventional RF modulator (not shown). Although not shown in FIG. 8, the front of the enclosure housing the MPEG encoder preferably has an interface for accommodating an infrared remote control unit.

FIGS. 7A through 7D together form a flowchart showing operation of VRU 34 for ordering video information. Voice switch 12 establishes connectivity with VRU 34 which answers the incoming call placed by the subscriber from either the subscriber's premises or from a remote location. In either case, the selection, if available and approved, will be transmitted to the premises.

The VRU prompts the subscriber for a user ID which is input via the DTMF pad of telephone instrument 102 of FIG. 2. The subscriber may be calling from the subscriber premises or from a remote location to make the selection. The user ID is checked at gateway data base 32 and, if valid, the VRU prompts for a video selection. The video selection is then input using the DTMF pad of telephone instrument 102 which then sends the selection information to the VIP via video gateway 30 and packet data network 40. The VIP identifies the requested title and determines if the title is available, and if the holder of the ID is authorized to receive the title requested. This may be carried out by table look-up to a data base containing each title, and its rating, and comparing the title rating with a viewer classification embedded in the ID or stored in the data base. The subscriber thus can assign different IDs to various members of the family (for example, children), each ID representing a different range of authorized titles.

If the title is found, the requesting viewer has not been restricted from viewing the title, and the title has not been previously queued for transmission, the corresponding data file is opened at the predesignated time and a reserve idle communications port is identified for transmission of the video data to DCS node 26. Transmission of the data is delayed for a predetermined number of minutes in response to a first request for a video selection to allow for simultaneous transmission of the video data file to subsequent subscribers placing an order for the same title within the delay period. The subsequent request orders are also placed in the queue and the associated communications port ID is matched to the subscriber's network address.

After expiration of the predetermined delay, i.e., when current time as shown in the flowchart equals the designated start time, the video data file is transmitted from VIP 140 or 160, as appropriate, through DCS nodes 24 and 26 to the designated ADSL interfaces 16 and 18 for transmission to subscriber premises 100 and 120. At the end of the program, a message is transmitted to Network Management System 28 to take the system down by terminating connectivity between DCS nodes 24 and 26.

The subscriber may review the selections made by choosing from the screen menu a "view selections" option. This accesses a data base at the gateway 32 to display a history of all selections that have been made under each ID number and when each selection is scheduled to be played.

In an enhanced version of the video-on-demand system, subscriber premises 120 (FIG. 2) is provided with a control unit 130 for receiving data commands from a remote control 132. Remote control 132 can be a conventional infrared remote control for interacting with control unit 130. Data from control unit 130 is provided to subscriber ADSL interface 124 or, although not shown, to decoder 126 for transmission of command data to ISDN D-channel or X.25 interface 38. The interface 38 can provide subscriber order information directly to video gateway 30 in lieu of using voice response unit 34. Once video gateway 30 identifies a subscriber request to establish connectivity between the subscriber and a VIP 140 or 160, the address of control unit 130 is provided to the selected VIP. Upon receipt of the corresponding VIP network address by control unit 130, direct connectivity is established between control unit and VIP 140 or 160 over packet data network 40. This connectivity permits direct data transfer between the customer premises and the associated VIP to support interactive video control used in interactive educational programming and interactive video presentations such as video games.

Control unit 130 provides user interactive control of the buffered video data. As shown in FIG. 2, temporary storage device 42 can be controlled over packet data network 40. Within the limits of data stored in the buffer, the subscriber can fast forward, preview, rewind, forward, reverse search and pause the video/audio data provided via DCS 24 to the subscribers premises. If the requested function exceeds the capability of the temporary storage to buffer information provided by the VIP, the subscriber will have the option of cancelling the request or rescheduling into a later transmission of the video programming. For example, if a pause request initiated via control 130 results in overflow of temporary storage 42, video transmission to the customer premises under user control will be continued or rescheduled.

VIPs 140 and 160 include respective control units 142 and 162 for accessing video storage units 144 and 164. As described earlier, the VIP stores the requested program material in coded or compressed digital format to minimize storage requirements and transmission bandwidth. Suitable video coding algorithms rely on Motion Compensated Prediction (MCP) and Motion-Compensated Interpolation (MCI). Motion Compensated Predictive/Interpolative Coding (MCPIC) is described in Wong et al. "MCPIC: A Video Coding Algorithm for Transmission and Storage Applications", Nov. 1990 IEEE Communications Magazine. MCPIC provides compression of video information for VCR quality playback using preprocessing and encoding of the video source information to obtain a coded bit stream. The bit stream represents a progressive format of 30 frames per second, each frame having 352×240 samples for luminance (Y) and 176×120 samples for each of two chrominance channels (U and V). The MCPIC algorithm supports video material ranging from slow to fast motion with a resolution equivalent to that of consumer-grade VCRs.

Another compression technique using Motion Estimation, Motion-Compensation Predictive Coding and Adaptive Discrete Cosine Transform (DCT) quantization is supported by the International Standards Organization (ISO) Moving Pictures Expert Group (MPEG). MPEG-1 specifies a coding algorithm having a video data rate of 1.2 mbps and a composite video and audio rate of 1.544 mbps including overhead. This digital-video and digital-audio compression standard can be accommodated by a T-1 line or a D-1 channel to provide full-motion video within the 1.544 mbps data channel provided by an ADSL to the subscriber premises. MPEG programmable decoder/processors, capable of decompressing digital video in real time, have been produced by such companies as C-Cube Microsystems and LSI of San Jose, Calif. These or equivalent devices are incorporated into decoders 106 and 126 shown in FIG. 2 to generate standard NTSC analog video and analog audio signals.

In addition to the basic video-on-demand architecture shown in FIG. 2, other features can be incorporated into the PSTN under software control. For example, a subscriber can elect to implement call blocking through switch 12 to avoid interruptions from incoming calls during the duration of the video program. Incoming calls would instead be diverted to a subscriber's voice mail box.

VRU 34 may additionally include voice recognition capability to support voice recognition security functions and voice selection of video programming.

Figure 10:
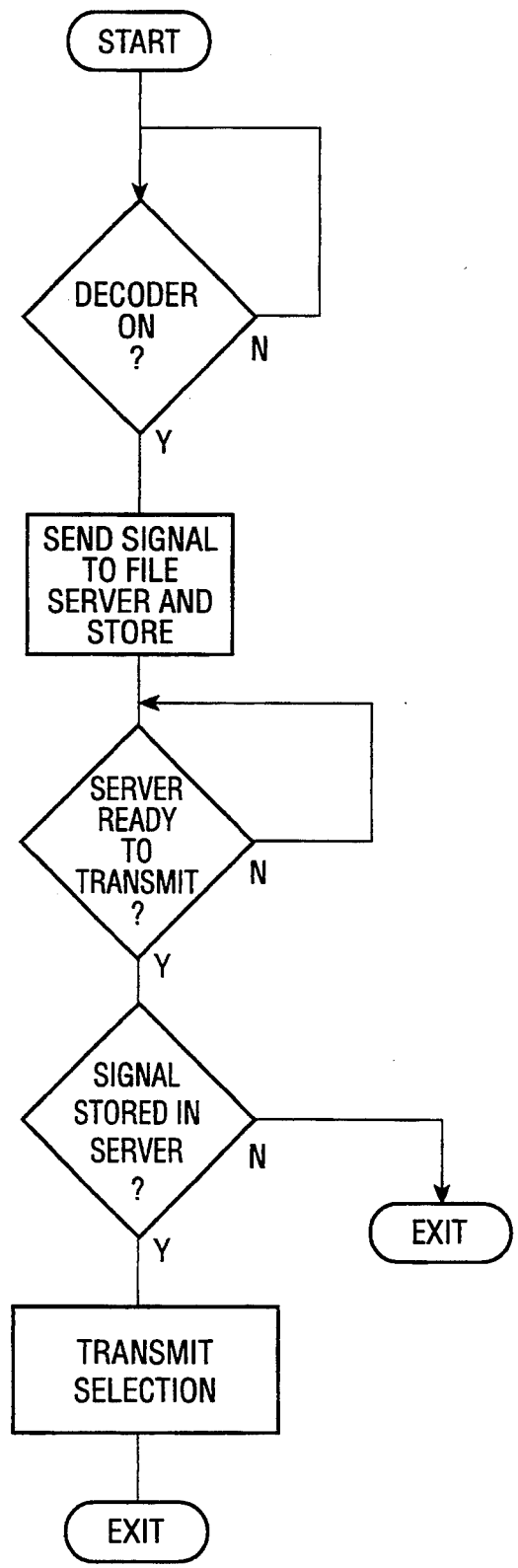
FIG. 10 is a flow diagram showing communication between a subscriber decoder and the gateway for controlling transmission of a selection to confirm that the decoder is turned on, in accordance with an aspect of the invention.

Another feature is based upon the ability of a subscriber to the video-on-demand service as described herein to make a selection either from the subscriber's premises or from a remote location. In the system as described in the copending application, if the subscriber does not remember to turn the television on at the reserved time to receive the selection, the VIP will transmit the selection anyway, and the subscriber will be billed. In accordance with another aspect of the invention, and with reference to FIG. 10 describing a gateway program routine, decoder 126 at the subscriber's premises, upon being turned on, transmits a signal on channel 304 (FIG. 4) to the gateway 30, whereupon the signal is stored, indicating that the subscriber is ready to receive the selection at the reserved time. The stored signal includes an address portion that identifies the premises of the subscriber corresponding to the ID received by the VIP facilities 140, 160 via the gateway 30 at the time the selection was made. If no such signal is stored at the VIP, the selection is not transmitted.

As an additional feature of the invention, the gateway 30 is further programmed to send to each subscriber a screen image summarizing the current video selections that have been made and are awaiting transmission at the designated times, and the time to elapse before the next video selection will play. In the case of "impulse" selections, when the video will be transmitted to the subscriber immediately or within a predefined short period of time, the screen will confirm the selection, and may be supplemented by commercial messages.

Figure 11:
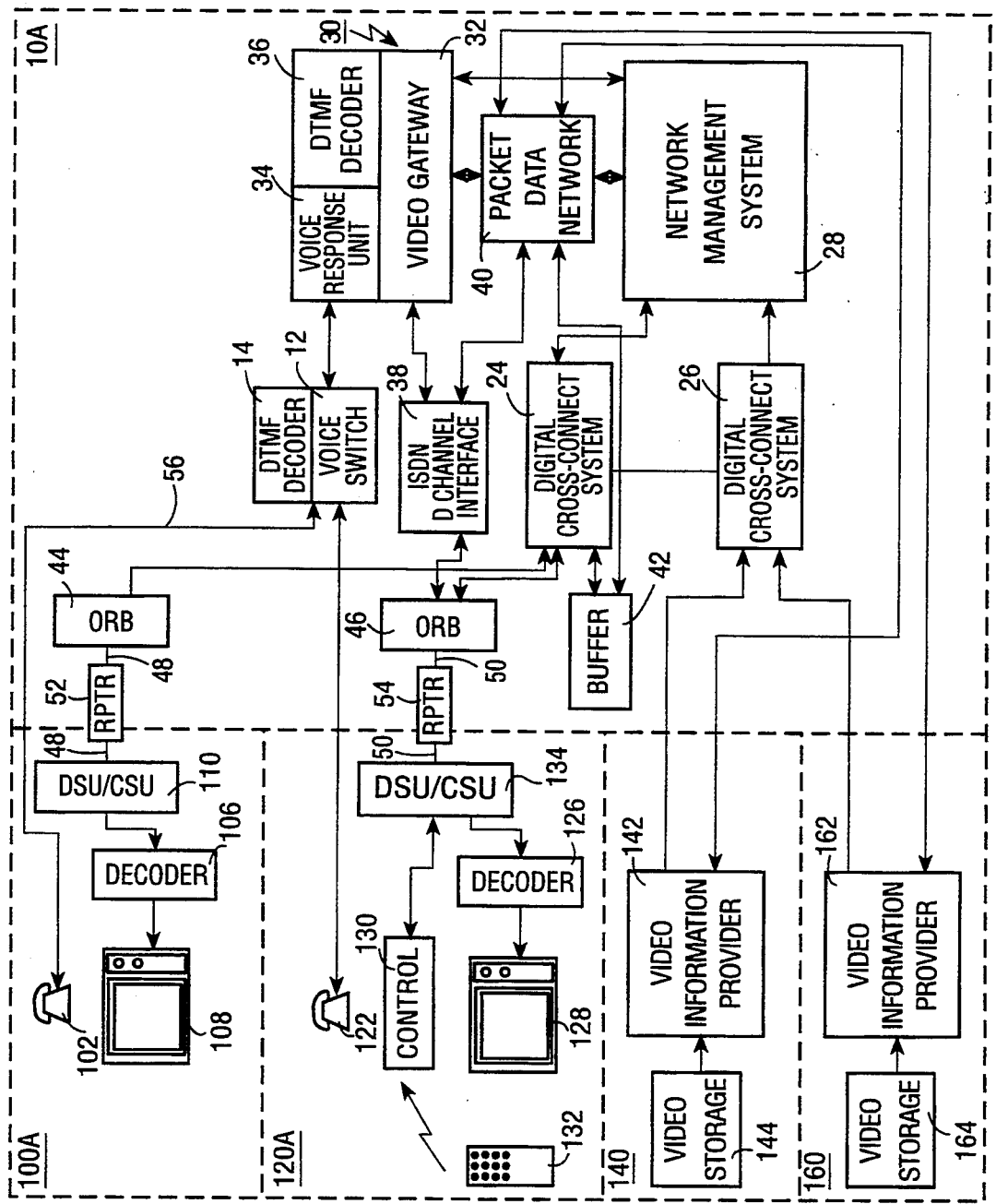
FIG. 11 is a block diagram of an alternative embodiment of a video-on-demand system using separate T1 and POTS loops.

An alternative embodiment of the invention is shown in FIG. 11, wherein connectivity between central office 10a and subscriber premises 100a and 120a is provided by respective High-bit-rate Digital Subscriber Lines (HDSL) and separate POTS lines. The HDSL uses bidirectional four wire T1 lines 48 and 50, including repeaters 52 and 54 to connect Office Repeater Bays (ORB) 44 and 46 to Customer Service Units (CSU) and Digital Service Units (DSU) 110 and 134 located in respective customer premises 100a and 120a. The HDSL requires two pairs and provides full duplex transport at a DS1 rate for loops limited to a CSA standard range. Because the HDSL does not provide a low bit-rate data channel, data from the subscriber premises to the CO is carried at full duplex bidirectional T1 service. Separate POTS service is provided on lines 56 and 58. The subscriber loop may also comprise a copper Digital Loop Carrier (DLC) wherein analog data is converted to a digital format and transported over a T1 copper loop circuit. The remaining structure and operation of the video-on-demand system shown in FIG. 11 are otherwise generally the same as in the embodiment of FIG. 2.

Figure 12:
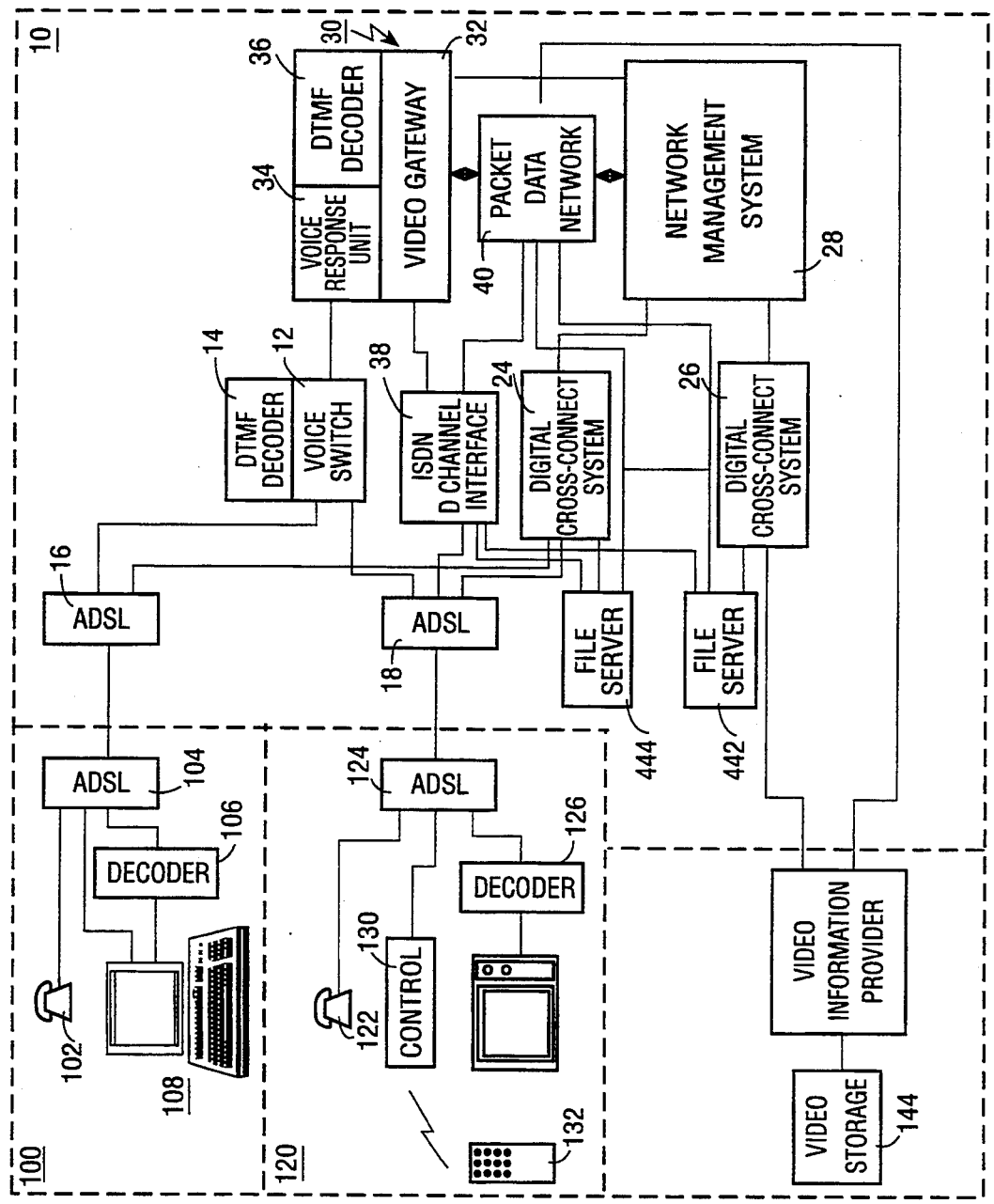
FIG. 12 is a block diagram of an embodiment of the invention implementing a file server at the central office for administering subscriber selections.

With reference now to FIG. 12, in another embodiment of the invention buffer 42 is replaced by file servers 442, 444 carrying out data session control between video library ports of video information provider 175 and remote users. The video information provider 175 serves not only video information but other types of information, such as still pictures, interactive video, etc., sometimes termed "multi-media." The network control software of the file server 142, 144 in combination with management resources of the PSTN control the "network session" between an output controller of the file server, external program providers, and user ports. The session manager also maintains a record of relevant data regarding each session which is forwarded to a customer billing system.

As in the video-on-demand service of FIG. 2, subscriber local loops are equipped with ADSL devices 104, 124, 16, 18 connected to DCS 24. The enhanced video-on-demand distribution system provides simultaneous transport of a one-way 1.544 mbps signal over the same twisted pair transmitting voice messages to the residential subscriber. As in the architecture of FIG. 2, the ADSL transported signal is demultiplexed and the 1.544 portion is decoded using MPEG standard techniques to deliver a full motion video signal.

CO equipment 10 establishes connectivity from VIP 175 through the system to file servers 442, 444 and subscribers 100 and 120. Connected to voice switch 12 are the ADSL equipment 16 and 18 for multiplexing (i) voice and signaling information from voice switch 12 and (ii) digital video file data from DCS 24 onto respective subscriber local loops 20 and 22. Video and other media file data from VIP 175 are provided to DCS node 26 and selectively supplied to file server 442 or immediately transmitted to DCS node 24 for supply to file server 444 under control of Network Management System 28.

In addition to providing video file programming, the file servers 442, 444 accept video and other media file programming from VIP 175 for later transmission and for real-time and multi-pass encoding. Real-time encoding is used to provide encoded high bandwidth signals, such as full motion video, while minimizing network transmission requirements and providing a signal compatible with ADSL connectivity to subscriber premises 100 and 120. Multi-pass encoding performed by the file servers provides a higher quality video signal for storage and later transmission over the network to subscriber premises 100 and 120 than is possible with single-pass encoding.

ADSLs 16 and 18 multiplex data on subscribers loops 20 and 22 using frequency multiplexing, dividing the available loop bandwidth into the same three channels as is shown in FIG. 4. Compressed video file data is contained between the same 100 and 500 kHz band to provide a 1.6 mbps channel for transporting the video file data over respective loops 20 and 22 to customer premises 100 and 120.

Figure 13:
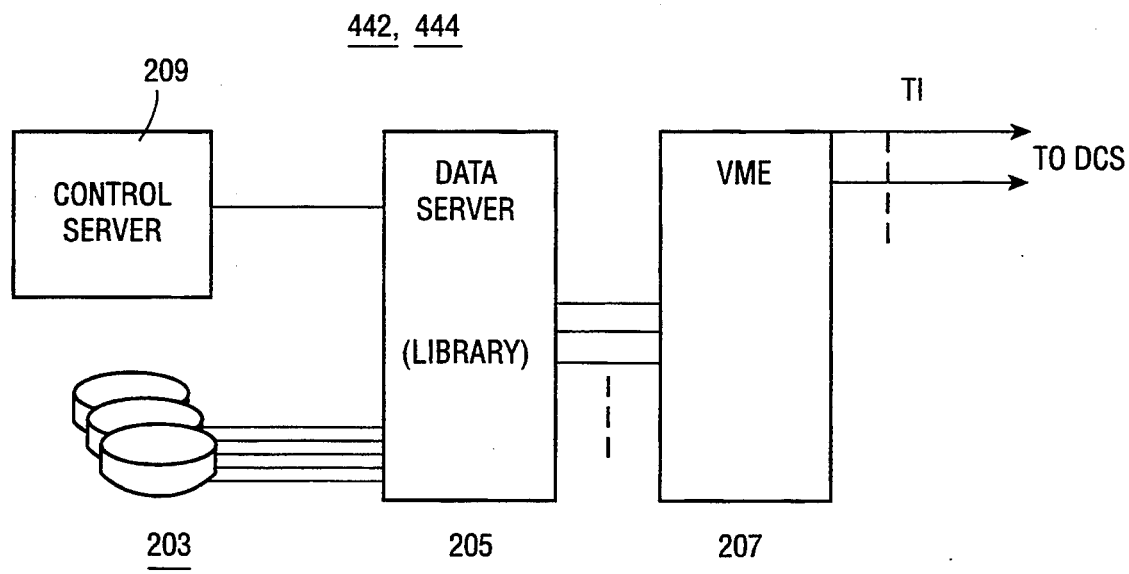
FIG. 13 is a simplified diagram of the file server of FIG. 12.

The file servers 442, 444, shown in further detail in FIG. 13, comprise a redundant array of data storage disks 203 incorporating layer 3 and 5 error correction. Sections of data are distributed non-contiguously among the disks. Parity information stored with the data enables data to be rebuilt on the fly if any of the array of disk drives is lost. Bandwidth within the processing plane of a VIP resident computer (not shown) must be sufficient to read and write a predefined number of data streams. A single source of control 209, if sufficiently large, can manage plural such file servers; an example is a RISC 6350. Data provided by the server under control of the control server 209 is supplied with appropriate protocol conversion to a virtual memory extender (VME) 207 and to DCS 24.

The control server 209 keeps track of all available movies or other information, and routes the movies to subscribers at an appropriate port through a high bandwidth interface. The control server 209 has a large number of ports, each port controlling a single transmission to one or more subscribers sharing the session (viewing a movie). The state of each port is known by a table stored in the control server.

Upon receipt of an order from the gateway 30, the control server bundles the order with other identical orders received recently, and assigns a port based on the states read from the table. For example, a particular port will be reserved for all subscribers placing the same order within the next five minutes. Conversion between the telephone number of the subscriber and frame address for establishing a physical connection through the DCS is carried out in the gateway 30 by table look-up in gateway data base 32.

File servers 442, 444 process all requests from video gateway 30 to provide video file and video file feeds to customer premises via the DCS and ADSL systems. The file servers perform input of video and other information files from VIP 175, store these files or pass real-time data through to subscribers 100 and 120, monitor and record user sessions, process interactive control requests from users, and control outputs to the users.

The file servers 442, 444 also process and supply video file services including interactive learning, interactive games, and other presentations. The servers further store and process all data required for video file and other media applications including text, still pictures, audio, and partial and full motion video, as well as interactive application scripts.

Figure 14:
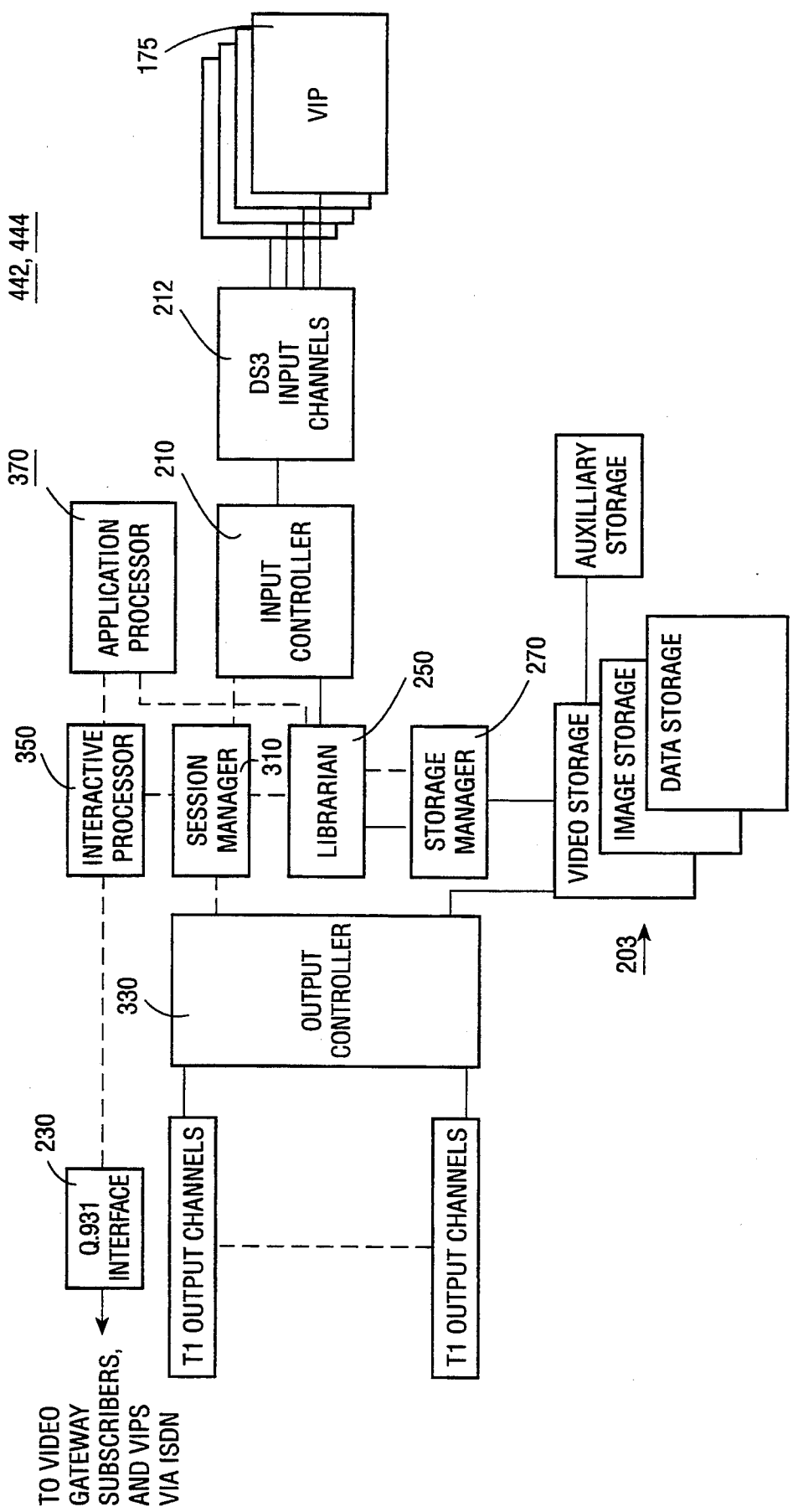
FIG. 14 is a functional block diagram of the file server.

Referring to FIG. 14, file servers 442, 444, shown in more detail, include eight major component systems: input controller 210, Q.931 or X.25 interface 230, librarian 250, storage manager 270, session manager 290, output controller 330, interactive processor 350 and video file application processor 370.

Input controller 210 includes a plurality of DS-3 input ports 212 for receiving video file data including digitized video in the form of MPEG encoded digital video signals of D1 digital video. D1 digital video is supplied to librarian 250 for MPEG encoding. Video supplied in MPEG encoded format is selectively supplied to output controller 330 or to gateway interface 410 to be routed to session manager 310 for eventual storage by the file server.

Interface 230 provides connectivity between interactive processor 350 and ISDN D Channel Interface 38 (FIG. 12). Interactive processor 350 receives command data over the ISDN from subscribers running interactive programming from the file server. Interactive programs include Video file presentations and video games. Interactive processor also receives command data from subscriber control unit 130 for interactive control of feature presentations including pause, fast-forward, reverse, and other "VCR" type capabilities supported by the file server. These latter commands are passed to session manager 310 for further processing and control of the video programming.

Data to be stored or retrieved from memory is first routed through librarian 250 and, under its control, storage manager 270 either stores the program data or retrieves and provides previously stored program data to output processor 330.

Figure 15:
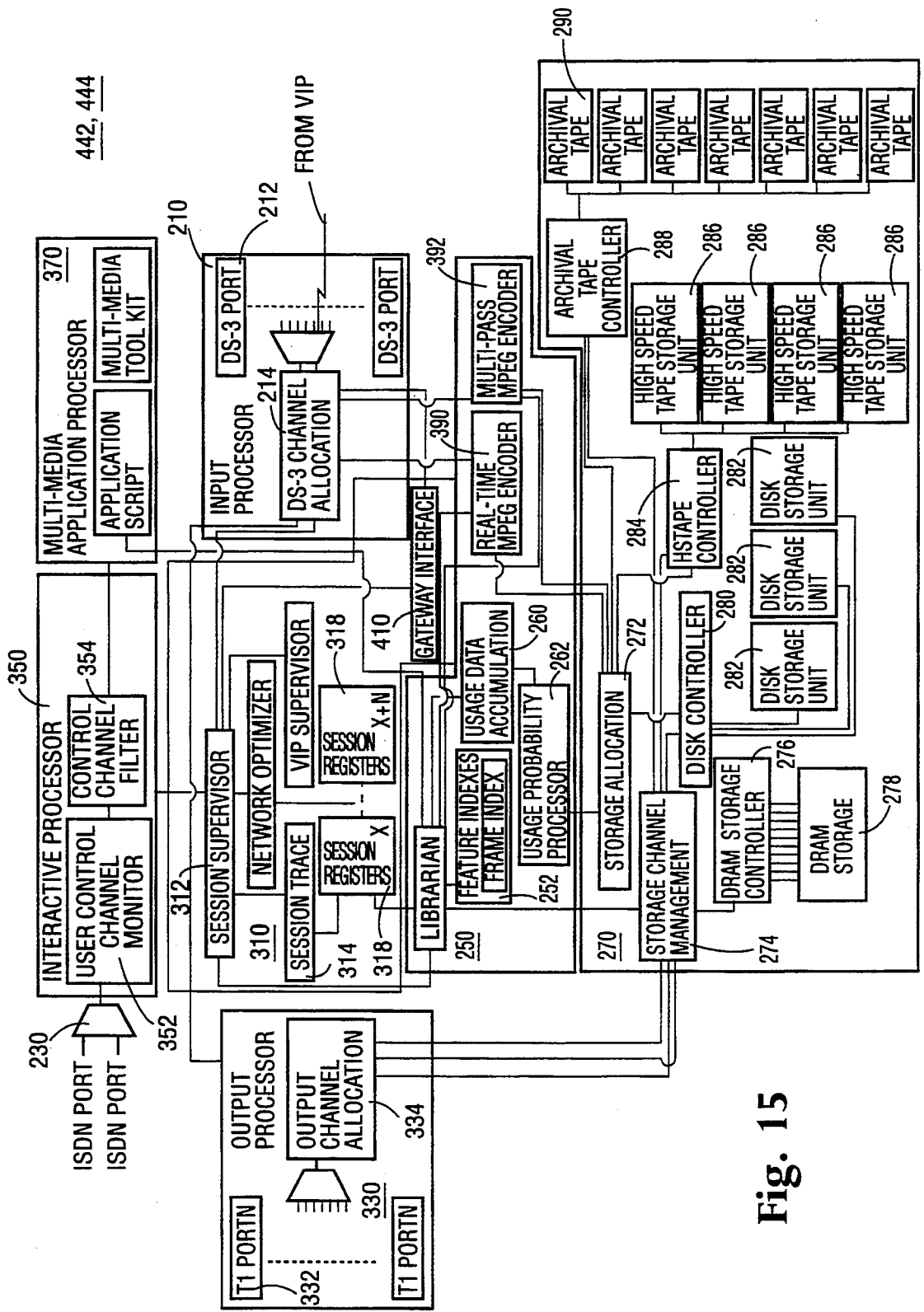
FIG. 15 is a more detailed block diagram of the file server.

File librarian 250 controls distribution of video, audio, still image data and text selections to session manager 290 in response to information requests from session manager 290 and video file application processor 370. Referring to FIG. 15, the Librarian further monitors and record in feature index 252 the storage location of all video selections for video-on-demand and video file applications. The librarian 250 also records a history of access to video programming, i.e., "features" and to other data provided during each twenty-four hour period in usage data accumulation system 260. The usage data is supplied to usage probability processor 262 to establish an intelligent cache using DRAM Storage 278 for rapid access and highly addressable storage of features.

Feature indexes 252 maintain a catalog of data and support processing for storing all locally stored programs. This includes the allocation of storage media type and space, maintenance of addressing tables for program stat and frame indices, and indexes for all volumes. The program listing data is supplied to a menuing system supported by video gateway 30 (FIG. 12) via packet data network 40. Gateway 30 may comprise a RISC 6000 computer.

Feature indexes system 252 performs required catalog maintenance functions including input of new feature program data into the system, ageing, and deletion or archival of aged program data. New program data from VIP 175 to be stored by the file server are received via a DS-3 port 212 of input processor 210. The catalog maintenance system determines the priority of the incoming program data and allocates appropriate storage to the data. Once the file space is allocated and the file is stored, the volume indexes are updated, the frame positions of the program are calculated and frame addressing tables are created and stored. The frame addressing tables are used to address a feature from any position in the feature.

When it is determined that stored feature is no longer required, file librarian 250 removes the program data from the file catalog. The record to be deleted is then flagged by the system administrator.

Librarian 250 tracks frequency of feature access. As a feature is requested less frequently, it is "aged" by the file server. Usage probability processor 262 assigns a priority value to the feature which is used to determine the appropriate storage type to maximize system resources while providing acceptable access time to the feature based on its demand history. Once a feature is aged to a point of not having been requested within a predetermined time period, the File Server removes the program from on-line storage units 278, 282 and 286 and places it in archival storage 290. The feature header data remains stored in Feature Indexes 252, although access time for the feature will be increased.

The catalog system updates feature titles data as the features are loaded into the file server 242, 244. The updated catalog information is supplied by librarian 250 of the file server to video gateway 30. The data supplied to the video gateway is shown in Table 1.

TABLE 1

| Element | Use | Origin | Type |
| --- | --- | --- | --- |
| Feature Title | To be used by the menu system to update the list of features provided for the users | Video information provider or programmer | |
| Feature Index Number | Used by the gateway when transmitting a request to the server | Librarian | Alpha/Numeric |
| Priority | Used by the gateway to determine the set-up and wait time for a feature | Originally determined by the feature box office ranking. Subsequently determined by the Trend processor | Integer |
| Feature Length | Used for schedule processing by the gateway | VIP/Programmer | |
| Key Actor/Actress, Author, Director, Subject | Used by the gateway for performing searches on the elements listed | VIP | Array |
| Motion Picture Association Rating | Used by the gateway for feature type blocking based on rating: G, PG, PG-13, R, NC-17, XXX | VIP | |
| Category | Used by the Gateway Menu processor to determine the placement of the title | VIP | |

Usage probability processor 262 statistically determines features having the highest probability of usage on a per hour, day of week basis to properly allocate high order storage, i.e., DRAM storage 278, on an hourly basis. In support of this function, usage data accumulation 260 stores tables of data including time of viewing, day of viewing and cumulative number of requests each time a feature is supplied.

Allocation of storage in the file server 242, 244 is based on the ranking of a feature and the output of the trend processing performed by usage probability processor 262. Storage is divided into several components, including DRAM 278, magnetic disk 282, high speed magnetic tape 286 and archival magnetic tape 290. All features are stored on the appropriate media based on the priority ranking of the feature. For example, DRAM storage 278 is used for the highest priority features as determined by the trend processing whereas archival storage is used for the lowest priority features. Table 2 gives typical priority assignments and storage capabilities of each media.

TABLE 2

| Priority | Number of Features | Storage |
| --- | --- | --- |
| 1 | 20 ± 5 | DRAM |
| 2 | 100 ± 20 | MAGNETIC DISK |
| 3 | 300 ± 50 | HIGH SPEED TAPE |
| 4 | 500 + | ARCHIVAL TAPE |

DRAM storage 278 in the described embodiment is used for the highest twenty features and data files as determined by the trend processing. When a feature or other high priority media file is stored in DRAM, it does not occupy magnetic storage space until removed from DRAM storage. A compressed feature length movie of 90 minutes duration occupies approximately 1.2 gigabytes.

Disk storage units 282 are fast access magnetic and/or optical media providing storage for the second highest fifty priority features and media data files as determined by the trend processing. When a feature is stored on a Disk unit, it does not occupy DRAM or tape storage until removed.

High speed tape storage units 286 store features and media data files having a medium priority as determined by the trend processing. Finally, archival tape storage is used for the lowest priority of features and media data files.

Storage channel management processor 274 controls the flow of data between all storage devices and output control processor 330. Input control processor 210 receives video file and feature program data from multifile VIP 175. Feature data input streams are accepted either as MPEG encoded digital video or as D1 digital video for encoding by the file servers 442, 444, shown in FIG. 14. All data is either stored for play at a user's request or passed directly through to the user as real-time programming. Preferably, two or more passes of the digital video are processed by the encoder for image enhancement prior to storage. Consecutive frames of video are compared, and discrepancies corrected using well known image enhancement methodology.

MPEG encoded video data received at DS-3 port 212 of input processor 210 is routed to session supervisor 312 for storage by the file server or as flow through to an appropriate output port 332 of output processor 330. Session manager 310 supervises the data flow once connection from the video file information provider to the subscriber is established by input control processor 210 and output processor 330. No data is stored and no index information is supplied to librarian 250.

For non-encoded data, a simplified form of MPEG encoding is performed by real-time MPEG encoder 390, requiring a latency of approximately ten minutes from data input to data output. Multi-pass MPEG encoder 392 is used for non-real-time processing, and provides full MPEG encoding of video data. Both MPEG encoders receive non-encoded video data from input processor 210 and provide encoded video to storage allocation processor 272 of storage manager 270. The encoded video data is either stored in an appropriate storage media or transmitted by storage channel management controller 276 to output controller 310 for transmission to a subscriber over the PSTN.

Session manager 310 includes session supervisor 312 which manages all program sessions including system access by video-on-demand subscribers, other video file users and input and output to, from and through the file server by multi-file information providers. Session supervisor 312 tracks and records all data considered pertinent to a users session including output port, input port (if receiving data directly from a video file information provider or if the user is a video file information provider), feature being played or video file application address, feature index data, feature frame data, and sessions condition. The session supervisor also performs network resource optimization by the simultaneous broadcast of the same feature over one output port to multiple subscribers. However, each subscriber session is individually managed to permit interactive features such as video pause.

Session trace processor 314 tracks each subscriber's session based on feature and frame so that the execution of a pause sequence can be managed for each individual session. A subscriber may start viewing a feature as one subscriber as part of a larger group. Selection of a pause function places the subscriber "out of sync" with the rest of the group and, hence, requires establishment of a separate session for that user and requiring session manager 310 to cause the gateway 30 to establish a new network link to the subscriber's viewing location. Although each user is assigned an individual logical session, sessions in sync with one another can share output and network facilities.

The pause function is implemented at the servers 442, 444 of FIGS. 13-15 by a logical session register designated for each subscriber and for each session. When a command to commence a pause is received from the subscriber, a counter associated with the designated register is stopped, and transmission of a movie to that subscriber is interrupted while the same transmission to other subscribers sharing the session continues. When a command to unpause is received from the subscriber, transmission of the movie to the subscriber is resumed, not from the original session but from another, if any, carrying the same movie, delayed by a predefined amount of time, e.g., 5 minutes. If there is no session of the same movie within the predefined time frame concurrently transmitting to other subscribers, a new session is initiated. The new session transmits the same movie to the subscriber, not from the beginning but from a few frames preceding the last frame played when the pause command was received, to ensure synchronization. Other functions, such as fast forward, reverse, are carried out as in FIG. 2 using buffering (not shown in FIG. 12).

During the time the subscriber is waiting for the movie to continue, following a pause, or prior to initial transmission of the movie, a commercial message may be played in common to all subscribers sharing that session.

Session supervisor 312 maintains a matrix of routing information for each session, including what users are assigned to a given output port, and the source of the input data: input port or local storage. A file play clock uses the total number of frames in a given feature to estimate, by time, the frame position for that feature. This data is provided to the session registers 318 for tracking frames for each logical subscriber session and is used to restart an interrupted session. Session supervisor 312 discontinues register updates upon detection of a session interruption. The session supervisor also receives all requests from gateway 30 via interface 230 and control channel filter 354 to establish a session and for file retrieval.

Interactive processor 350 processes incoming commands from subscribers sites once a session is established by the gateway 30. These commands include pause or like features for video-on-demand, and all response and requests by multi-file work stations. The incoming data is interrogated for content and selectively forwarded to the appropriate module for processing: session manager 310 for video-on-demand and other retrieval applications and to multi-file application processor 370 for multi-file applications.

Control channel monitor 352 monitors each subscriber's control channel to detect a communication failure. In the event of a failure, session manager 310 is informed and corrective action is initiated. Furthermore, if monitor 352 determines that the subscriber's ADSL unit has not been turned on at the designated time, the session manager 310 aborts the transmission.

Dial-up access to the file server is provided by voice switch 12 which establishes connectivity with VRU 34 which answers the incoming call. As in the embodiment of FIG. 2, the VRU prompts the subscriber for a user ID which is input via the DTMF pad of telephone instrument 102. The user ID is checked and, if valid, the VRU prompts for a video selection. The video selection is then input using the DTMF pad of telephone instrument 102 which then sends the selection information to the file server via video gateway 32 and packet data network 40. The file server identifies the requested title and determines if the title is available and notes any viewer restrictions.

If the title is found, is not restricted from the requestor and has not been previously queued for transmission, the corresponding data file is opened and a reserve idle communications port is identified for transmission of the video data to DCS node 26. Transmission of the data is delayed for a predetermined number of minutes in response to a first request for the video selection to allow for simultaneous transmission of the video data file to subsequent subscribers placing an order for the same title within the delay period. The subsequent request orders are also placed in the queue and the associated communications port ID is matched to the subscriber's network address.

After expiration of the predetermined delay, i.e., when current time equals the designated start time, video data file is transmitted from file server through the DCS to the designated ADSL interfaces 16 and 18 for transmission to subscriber premises 100 and 120. At the end of the program, a message is transmitted by the file server to network management system 28 to take the system down by terminating DCS connectivity.

Although the present invention has been described and illustrated in detail, it is clearly understood that the same is by way of illustration an example and is not to be taken by way of limitation, the spirit and scope of the present invention being limited only by terms of the appended claims.

We claim:

1. A central office based public switched telephone network for supplying video information from a digital information storage medium to designated subscriber premises, comprising:

a telephone company central office receiving video information signals from a video information server and subscriber orders from a prescribed subscriber, said central office including a video gateway for providing routing data in response to subscriber orders and a switch for routing video information signals from said server to the prescribed subscriber in accordance with said routing data;

a central office interface for transmitting or receiving audio telephone service signals, subscriber control signals and digital information signals on, respectively, first, second and third signal channels;

each said subscriber premises including a subscriber interface for transmitting or receiving audio telephone service signals, subscriber control signals and digital multimedia information signals on, respectively, the first, second and third signal channels; and a plurality of subscriber local loops interconnecting corresponding subscriber and central office interfaces.

2. A switched network for providing digital video signals from a video information provider to any one of a plurality of subscriber premises, comprising:

an exchange receiving digital video signals from a video information service provider and subscriber orders from one or more of the subscribers, said exchange including a video gateway for providing video routing data in response to the subscriber orders and a switch for routing selected digital video signals to subscriber premises in accordance with said routing data;

for each of the subscriber premises, a first multiplexer/demultiplexer coupled to the exchange, a second multiplexer/demultiplexer at the subscriber's premises and a subscriber local loop interconnecting the first multiplexer/demultiplexer and the second multiplexer/demultiplexer, wherein each said first multiplexer/demultiplexer transmits or receives audio telephone service signals over the subscriber local loop, receives subscriber control signals over the subscriber local loop and transmits selected digital video signals from the switch over the subscriber local loop in first, second and third signal channels respectively which are independent of each other, and each second multiplexer/demultiplexer transmits or receives audio telephone service signals over the subscriber local loop, transmits subscriber control signals over the subscriber local loop and receives selected digital video signals over the subscriber local loop in said first, second and third signal channels.

3. The network of claim 2, wherein said first channel is a bidirectional channel carrying said audio telephone service signals between the subscriber and the exchange, said second channel is a unidirectional channel carrying subscriber control signals to said exchange, and said third channel is a unidirectional channel carrying digital video signals from said exchange to the subscriber.

4. The network of claim 3, wherein said first, second and third channels occupy progressively increasing frequency bands on the subscriber local loop, with the first channel occupying the lowest.

5. The network of claim 4, wherein said first, second and third channels are non-overlapping.

6. The network of claim 3, wherein the third channel has a bandwidth substantially wider than do the first and second channels.

7. The network of claim 2, wherein said second multiplexer/demultiplexer includes a splitter for supplying telephone service signals and video signals from the exchange to telephone and television terminals.

8. The network of claim 2, wherein said subscriber local loops comprise wire pairs.

9. The network of claim 2, wherein said subscriber local loops comprise coaxial cables.

10. The network of claim 2, wherein said subscriber local loops comprise optical fibers.

11. The network of claim 2, further comprising, for each subscriber, a decoder coupled to the second multiplexer/demultiplexer for converting an incoming digital video signal to an analog video output signal.

12. The network of claim 11, wherein said digital video signals comprise compressed digital data signals, and said decoder includes a decompressor for decompressing an incoming video digital data signal and producing analog video and associated audio output signals.

13. The network of claim 2, wherein said exchange further includes a packet data network responsive to said video gateway for supplying command signals to said video information provider.

14. The network of claim 2, including video storage means remote from the subscriber premises for buffering video data obtained from said switch and supplying buffered video data to a prescribed first multiplexer/demultiplexer.

15. The network of claim 14, wherein said first multiplexer/demultiplexer includes a control link output node for supplying said subscriber control signals to said video storage means.

16. The network of claim 2, wherein said video gateway comprises a memory storing subscriber access data, and said gateway is responsive to subscriber identification information and said stored access data to supply video scheduling data to said video information provider.

17. The network of claim 2, including a voice switch responsive to telephone number data transmitted from one of the first multiplexer/demultiplexers for establishing an audio connection from the local loop of a prescribed subscriber to the video gateway.

18. The network of claim 17, wherein said voice switch further supplies caller identification information to said video gateway that, in turn, supplies network address information to said switch for directing video data from the video information provider to said one of the first multiplexer/demultiplexers.

19. The network of claim 2, including voice response means for supplying to said switch a voice reply to order data received from a prescribed subscriber premises.

20. The network of claim 2, wherein said video gateway also provides video scheduling data in response to the subscriber orders and said switch routes selected digital video signals from the information service provider to subscriber premises in accordance with said scheduling data.

21. The network of claim 2, wherein said first multiplexer/demultiplexers include error correcting means for correcting errors received thereby over said subscriber local loops.

22. The network of claim 2, wherein said first and second multiplexer/demultiplexers perform frequency domain multiplexing and demultiplexing.

23. The network of claim 22, wherein said first and second multiplexer/demultiplexers also perform at least some time division multiplexing and demultiplexing.

24. The network of claim 22, wherein said first and second multiplexer/demultiplexers perform at least some time division multiplexing and demultiplexing.

25. A switched network for providing compressed video signals from a video information provider to any one of a plurality of subscriber premises, comprising:
an exchange receiving compressed video signals from a video information service provider and subscriber orders from one or more of the subscribers, said exchange including a video gateway for providing video routing data in response to the subscriber orders and a switch for routing selected compressed video signals to subscriber premises in accordance with said routing data;
for each of the subscriber premises, a first multiplexer/demultiplexer coupled to the exchange, a second multiplexer/demultiplexer at the subscriber's premises and a subscriber local loop interconnecting the first multiplexer/demultiplexer and the second multiplexer/demultiplexer, wherein
each said first multiplexer/demultiplexer transmits or receives audio telephone service signals over the subscriber local loop, receives subscriber control signals over the subscriber local loop and transmits selected compressed video signals from the switch over the subscriber local loop in first, second and third signal channels respectively which are independent of each other, and
each second multiplexer/demultiplexer transmits or receives audio telephone service signals over the subscriber local loop, transmits subscriber control signals over the subscriber local loop and receives selected compressed video signals over the subscriber local loop in said first, second and third signal channels.

26. The network of claim 25, wherein said compressed video signals comprise compressed digital data signals.

27. The network of claim 26, further comprising, for each subscriber, a decoder coupled to the second multiplexer/demultiplexer for converting an incoming digital video signal to an analog video output signal.

28. The network of claim 27, wherein said decoder includes a decompressor for decompressing an incoming compressed digital video data signal and producing analog video and associated audio output signals.

29. The network of claim 25, further comprising, for each subscriber, a decompressor coupled to the second multiplexer/demultiplexer, wherein said decompressor decompresses an incoming compressed video signal and produces video and associated audio output signals.

30. The network of claim 25, wherein said first channel is a bidirectional channel carrying said audio telephone service signals between the subscriber and the exchange, said second channel is a unidirectional channel carrying subscriber control signals to said exchange, and said third channel is a unidirectional channel carrying digital video signals from said exchange to the subscriber.

31. The network of claim 30, wherein said first, second and third channels occupy progressively increasing frequency bands on the subscriber local loop, with the first channel occupying the lowest.

32. The network of claim 31, wherein said first, second and third channels are non-overlapping.

33. The network of claim 30, wherein the third channel has a bandwidth substantially wider than do the first and second channels.

34. The network of claim 25, wherein said video gateway comprises a memory storing subscriber access data, and further wherein said gateway is responsive to subscriber identification information and said stored access data to supply video scheduling data to said video information provider.

35. The network of claim 25, said first and second multiplexer/demultiplexers perform frequency domain multiplexing and demultiplexing.

36. The network of claim 35, said first and second multiplexer/demultiplexers also perform at least some time division multiplexing and demultiplexing.

37. The network of claim 25, said first and second multiplexer/demultiplexers perform at least some time division multiplexing and demultiplexing.

38. A switched network for selectively providing voice telephone service, selectively combined with video signals from a video information provider to a plurality of subscriber premises, comprising:
a plurality of subscriber multiplexers/demultiplexers located at respective ones of said subscriber premises, each including
(i) a local loop input node for receiving a composite signal,
(ii) a splitter receiving said composite signal and supplying separate video output and subscriber telephone instrument signals, and
(iii) separate output nodes for said video output and subscriber telephone instrument signals;
a plurality of subscriber local loops providing communications connectivity from a respective one of said subscriber multiplexers/demultiplexers to a respective subscriber loop node;
a plurality of network multiplexers/demultiplexers, each including
(i) subscriber video input node for receiving a video signal and a subscriber telephone instrument node for receiving a telephone instrument signal,
(ii) a combiner receiving said video signal and said subscriber telephone instrument signal to supply a composite signal, and
(iii) a local loop output node for supplying said composite signal to a respective one of said subscriber loop nodes;
a voice switch receiving telephone instrument signals from said telephone instrument nodes and responsive to telephone number data transmitted by said telephone instrument signal for providing audio signal connectivity between subscriber telephone local loops,
a video scheduling unit responsive to a control signal receiving from a subscriber premise for providing video request data to said video information provider; and
a cross-connect switching system receiving video data from said video information provider and responsive to said video request data for supplying said video data to selected ones of said network multiplexers/demultiplexers,
wherein each subscriber multiplexer/demultiplexer further includes a node for receiving subscriber control signals and transmits said subscriber control signals over the subscriber local loop, and each network multiplexer/demultiplexer includes means for supplying said subscriber control signals to said video scheduling unit, and wherein said subscriber local loops carry said video signal, said telephone instrument signals and said control signals in first, second and third signal channels respectively which are independent of each other.

39. The network of claim 38, wherein said subscriber local loops carry said video signal in a broadband channel and carry said telephone instrument signals in a narrowband channel.

40. A switched network for providing digital video signals from a video information provider to any one of a plurality of subscriber premises, comprising:

network equipment receiving digital video signals from a video information provider and subscriber orders from a prescribed subscriber, said network equipment including a video gateway for providing routing data in response to subscriber orders, a data network responsive to said video gateway for supplying command signals to said video information provider, a network management system and a digital cross-connect switch controlled by said network management system and said data network for routing video signals from said video information provider to the prescribed subscriber in accordance with said routing data;

a network interface including, for each subscriber, a first multiplexer/demultiplexer for transmitting or receiving digital video signals on a first, unidirectional signal channel and subscriber control signals on a second signal channel;

each said subscriber premises including an interface including a second multiplexer/demultiplexer for transmitting or receiving digital video signals and control video signals on, respectively, the first and second signal channels;

a plurality of subscriber local loops interconnecting corresponding network and subscriber interfaces;

said network equipment further including a switch responsive to order data transmitted from said subscriber premises for transmitting said order data from the prescribed subscriber to the video gateway that, in turn, supplies network address information to said cross-connect switch for directing video data from the video information provider to a prescribed network interface;

a voice switch; and means for carrying voice communications between said voice switch and telephone equipment in each said subscriber premises, wherein said means for carrying voice communication comprises a third channel, said third channel being on said subscriber local loops.

41. The network of claim 40, wherein said subscriber local loops carry said video signal, said control signals and voice telephone signals in first, second and third signal channels respectively which are independent of each other.

42. The network of claim 41, wherein said first channel has a bandwidth substantially larger than do said second channel and said third channel.

43. The network of claim 40, wherein said subscriber control signals include command signals to selectively specify pause, rewind, and fast forwarding of a selected video program, said network further comprising means responsive to such command signals to control transmission of video signals to simulate pause, rewind and fast forwarding functions.

* * * * *